US005603133A

United States Patent [19]

Vrzalik

[11] Patent Number: 5,603,133

[45] Date of Patent: Feb. 18, 1997

[54] APPARATUS FOR ALTERNATING PRESSURE OF A LOW AIR LOSS PATIENT SUPPORT SYSTEM

[75] Inventor: John H. Vrzalik, San Antonio, Tex.

[73] Assignee: Kinetic Concepts, Inc., San Antonio, Tex.

[21] Appl. No.: 390,233

[22] Filed: Feb. 17, 1995

Related U.S. Application Data

[63] Continuation of Ser. No. 26,252, Mar. 3, 1993, abandoned, which is a continuation of Ser. No. 671,672, Mar. 18, 1991, abandoned, which is a continuation of Ser. No. 493,141, Mar. 12, 1990, abandoned, which is a continuation of Ser. No. 249,880, Aug. 27, 1988, abandoned, which is a continuation of Ser. No. 905,553, Sep. 9, 1986, abandoned.

[51] Int. Cl.$^6$ .......... A61C 7/00

[52] U.S. Cl. .......... 5/609; 5/914

[58] Field of Search .......... 5/607, 609, 449, 5/453–457, 468, 469, 914

[56] References Cited

U.S. PATENT DOCUMENTS

| | | |
|---|---|---|
| 359,879 | 3/1887 | Miller . |
| 552,672 | 1/1897 | Souney et al. . |
| 587,014 | 7/1897 | Packard . |
| 728,865 | 5/1903 | Cheetham . |
| 1,021,335 | 3/1912 | Robinson . |

(List continued on next page.)

FOREIGN PATENT DOCUMENTS

| | | |
|---|---|---|
| 210469 | 4/1956 | Australia . |
| 592676 | 2/1960 | Canada . |
| 0168213 | 1/1986 | European Pat. Off. . |
| 0228233 | 7/1987 | European Pat. Off. . |
| 1462733 | 12/1966 | France . |

(List continued on next page.)

OTHER PUBLICATIONS

Mark V–A Accesories Brochure, Mediscus Products, Inc.
Plastic Surgery Burns Brochure, Mediscus Products, Inc.
Mediscus Air Bed MK VA Brochure, Mediscus Products Inc.
Brochure entitled "How We Have Taken the Back Out of One of the Heaviest Jobs in Nursing"; LIC Care (Sweden) (undated).
Brochure entitled "Mecabed –Pressure Sores Preventation and Treatment by Mecanaids"; Mecanaids Ltd. (U.K.) (undated).
Brochure entitled "Immobility the Cause . . . Roto Rest the Cure" (undated).

(List continued on next page.)

*Primary Examiner*—Michael F. Trettel

[57] ABSTRACT

Apparatus for preventing bed sores in a bedridden patient including a frame and first and second sets of substantially rectangular air bags for supporting a patient thereon mounted transversely on the frame, all of the air bags being connected to a gas source to maintain low interface pressures between a patient and the air bags to inhibit the formation and permit healing of bed sores caused by prolonged contact with hard surfaces. The conformation of the air bags is such that when the adjacent air bags are alternately inflated and deflated, the patient is rotated from side to side on the bed to therapeutically inhibit pulmonary problems and maintain low interface pressures between the patient and the air bags. The conformation of the air bags retains the patient thereon when rolled in each direction.

The method of the present invention comprises inflating a plurality of adjacent air bags to a selected pressure for supporting a patient thereon to maintain low interface pressures between the patient and the air bags and alternately inflating and deflating adjacent air bags to cause the patient to be rotated from side to side to therapeutically inhibit pulmonary problems and maintain low interface pressures. The pressure in certain air bags can be maintained at a selected pressure, thereby substantially immobilizing a portion of the patient's body.

57 Claims, 17 Drawing Sheets

U.S. PATENT DOCUMENTS

| | | | |
|---|---|---|---|
| 1,334,042 | 3/1920 | Lopatka . | |
| 1,644,043 | 10/1927 | Tiedemann . | |
| 1,676,420 | 7/1928 | Anderson . | |
| 1,740,906 | 12/1929 | Rothauszky et al. . | |
| 1,772,310 | 8/1930 | Hart . | |
| 2,076,675 | 4/1937 | Sharp . | |
| 2,188,592 | 1/1940 | Cunningham . | |
| 2,491,557 | 12/1949 | Goolshee | 5/455 |
| 2,522,018 | 9/1950 | Blackman . | |
| 2,534,471 | 12/1950 | Norheim . | |
| 2,667,169 | 1/1954 | Kambourakis . | |
| 2,690,177 | 9/1954 | Hogan . | |
| 2,841,802 | 7/1958 | Leverett . | |
| 3,238,539 | 3/1966 | Koch . | |
| 3,302,218 | 2/1967 | Stryker . | |
| 3,303,518 | 2/1967 | Ingram . | |
| 3,378,859 | 4/1968 | Parker . | |
| 3,434,165 | 3/1969 | Keane . | |
| 3,477,071 | 11/1969 | Emerson | 5/61 |
| 3,485,240 | 12/1969 | Fountain | 5/61 X |
| 3,492,988 | 2/1970 | De Mare | 5/61 X |
| 3,678,520 | 7/1972 | Evans | 5/453 |
| 3,775,781 | 12/1973 | Bruno et al. . | |
| 3,909,858 | 10/1975 | Ducker . | |
| 3,935,604 | 2/1976 | Collins | 5/61 X |
| 4,451,944 | 6/1984 | James . | |
| 4,488,322 | 12/1984 | Hunt et al. | 5/455 |
| 4,525,885 | 7/1985 | Hunt et al. . | |
| 4,542,547 | 9/1985 | Sato . | |
| 4,551,874 | 11/1985 | Matsumura et al. | 5/453 |
| 4,638,519 | 1/1987 | Hess . | |
| 4,654,903 | 4/1987 | Chubb et al. | 5/61 |
| 4,686,722 | 8/1987 | Swart . | |
| 4,694,520 | 9/1987 | Paul et al. . | |
| 4,745,647 | 5/1988 | Goodwin . | |
| 4,797,962 | 1/1989 | Goode . | |
| 5,003,654 | 4/1991 | Vrzalik | 5/455 X |

FOREIGN PATENT DOCUMENTS

| | | |
|---|---|---|
| 2816642 | 4/1978 | Germany . |
| 3217981 | 5/1982 | Germany . |
| 30112 | 5/1971 | Ireland . |
| 4837990 | 9/1971 | Japan . |
| 5398793 | 1/1977 | Japan . |
| 52-26074 | 7/1977 | Japan . |
| 56-17099 | 9/1981 | Japan . |
| 6190659 | 10/1984 | Japan . |
| 6221328 | 7/1985 | Japan . |
| 5518008 | 4/1988 | Japan . |
| 946831 | 1/1964 | United Kingdom . |
| 1059100 | 2/1967 | United Kingdom . |
| 1576641 | 7/1970 | United Kingdom . |
| 1499938 | 2/1978 | United Kingdom . |
| 2026315 | 2/1980 | United Kingdom . |
| 2108837 | 5/1981 | United Kingdom . |
| 2090734 | 7/1982 | United Kingdom . |
| WO8404884 | 12/1984 | WIPO . |

OTHER PUBLICATIONS

Brochure entitled "Dr. Volkner's Lamellar Turning Bed"; Jan Stahl GmbH. (West Germany) (undated).

Brochure entitled "Behind these doors lies the solution to managing your most critical patients"; Kinetic Concepts, Inc. (U.S.) (undated).

Brochure entitled "The Egerton Turning and Tilting Bed Mark 2"; Egerton Hospital Equipment, Ltd. (England) (undated).

Brochure entitled "Egerton General Product Information"; Egerton Hospital Equipment, Ltd. (England) (undated).

Flyer or page from brochure showing Egerton Net Suspension bed; Egerton Hospital Equipment, Ltd. (England) (undated).

Article entitled "When you can't just hop into bed!"; Kentish Times, p. 15 (Oct. 25, 1973).

APPARATUS FOR ALTERNATING PRESSURE OF A LOW AIR LOSS PATIENT SUPPORT SYSTEM

This application is a continuation of application Ser. No. 08/026,252 filed Mar. 3, 1993, now abandoned, which is a continuation of application Ser. No. 07/671,672 filed Mar. 18, 1991, now abandoned, which is a continuation of application Ser. No. 07/493,141 filed Mar. 12, 1990, now abandoned, which is a continuation of application Ser. No. 07/249,880 filed Sep. 27, 1988, now abandoned, which is a continuation of application Ser. No. 06/905,553 filed Sep. 9, 1986, now abandoned.

BACKGROUND OF THE INVENTION

The present invention relates to a method and apparatus for alternating the air pressure of a low air loss patient support system. More particularly, it relates to a bed having a frame with two sets of air bags mounted thereto, a gas source which is mounted in the frame of the bed to supply a flow of gas to the two sets of air bags without the necessity for a separate unit having a blower and controls to supply the air bags, means on each of the air bags for moving a patient supported thereon toward one side of the frame and then back toward the other side of the frame when gas is supplied to the first set of air bags and then to the second set of air bags, and means on the air bags for retaining the patient on the air bags when the patient is moved toward the respective sides of the frames.

Such a bed can be used to advantage for the prevention of bed sores and the collection of fluid in the lungs of bedridden patients. Other devices are known which are directed to the same object, but these devices suffer from several problems. In particular, U.S. Pat. No. 3,822,425 discloses an air mattress consisting of a number of cells or bags, each having a surface which supports the patient formed from a material which is gas permeable but is non-permeable to liquids and solids. It also discloses an air supply for inflating the cells to the required pressure and outlets or exhaust ports to allow the escape of air. The stated purpose of the outlets is to remove condensed vapor for the cells or bags. The outlets on that mattress may be fitted with valves to regulate the air pressure in the cells as opposed to regulating the air pressure in the cells by controlling the amount of air flowing into the cells. However, the air bed which is described in that patent and which is currently being marketed under that patent is believed to have certain disadvantages and limitations.

For example, that bed has a single air intake coupler, located directly and centrally underneath the air mattress, for connection of the source of air. Access to this connection is difficult since one must be on their back to reach it. The location of the connection underneath the mattress creates a limitation in the frame construction because the air hose must pass between the bed frame members. The source of air to which the air hose is connected is a blower or air pump mounted in a remote cabinet which, because it must be portable, is mounted on casters. There are many times in actual use when the cabinet must be moved in order to wheel other equipment, such as I.V. stands, around it or for access to the patient. However, relocation of this blower unit by any significant distance requires disconnection of the air hose from the frame (inconvenient because of the location up underneath the frame) or the pendent control in order to avoid wrapping the air hose around the bed frame members. Of course, disconnection of the air hose results in the loss of air pressure in the air mattress, which is even less desirable.

Another disadvantage with that type of bed relates to the monitoring of patient body weight. When charting fluid retention and other parameters, the patient's body weight is monitored continuously. When a patient is bedridden, the only way to monitor body weight is to weigh both bed and patient, then subtract the weight of the bed. But when a portion of the bed hangs off of the bed, as the air hose does, and when the changes in weight being monitored are measured in ounces, it is very difficult to accurately chart the changes in body weight when the patient is on such a bed.

Further, the bed disclosed by that patent is limited in that only a finite amount of air can be forced or pumped into the air mattress. By eliminating the outlets described in that patent entirely, the air pressure in the bags can at least be maintained at that point which represents the maximum output of the source of gas. In the case of the bed described in that patent, if it is necessary to further increase the pressure in the air bags while the outlets are being used for their stated purpose, the only way to do so is to install a larger capacity blower in the cabinet. High air pressures may be necessary, for instance, to support obese patients. A larger capacity blower generally requires more power consumption and a higher capacity circuit which may not be readily available. Also, the larger the blower, the more noise it creates which is not desirable.

The limitations and disadvantages which characterize other previous attempts to solve the problem of preventing bed sores in bedridden patients are well characterized in English Patent No. 1,47, 018 and U.S. Pat. No. 4,425,676.

The prior art also discloses a number of devices which function to rock a patient back and forth by the use of air pressure. For instance, U.S. Pat. Nos. 3,477,071, 3,485,240, and 3,775,781 disclose hospital beds with an inflatable device for shifting or turning a patient lying on the bed by alternately inflating and deflating one or more inflatable cushions. U.K. Patent Application No. 2,026,315 discloses a pad, cushion, or mattress of similar construction. German Patent DE 28 16 642 discloses an air mattress for a bedridden person or hospital patient consisting of three longitudinal inflatable cells attached to a base sheet, the amount of air forced into each cell being varied so as to alternately rock the patient from one side of the mattress to the other. However, none of those mattresses or devices are designed for use in a low air loss patient support system. Further, the U.K. and German patents, and U.S. Pat. Nos. 3,477,071 and 3,775,781, disclose devices consisting of parallel air compartments which extend longitudinally along the bed and which are alternately inflated and deflated. Such a construction does not allow the use of the device on a bed having hinged sections corresponding to the parts of the patient's body lying on the bed so that the inclination and angle of the various portions of the bed can be adjusted for the patient's comfort.

U.S. Pat. No. 3,678,520 discloses an air cell for use in a pressure pad which is provided within a plurality of tubes which project from a header pipe such that the air cell assumes a comb-like conformation when inflated and viewed from above. Two such air cells are enclosed within the pressure pad with the projecting tubes interdigitating, and air is alternately provided and exhausted from one cell and then the other. That device is no suitable for use on a bed having hinged sections corresponding to the parts of the patient's body lying on the bed so that the angle of inclination of the various portions of the bed can be adjusted for the patient's comfort, nor is it capable of functioning in the manner described if constructed in the low air loss conformation.

A number of patents, both U.S. and foreign disclose air mattresses or cushions comprised of sets of cells which are alternately inflated and deflated to support a patient first on one group of air cells and then the other group. Those patents include the following U.S. Pat. Nos. 1,772,310, 2,245,909, 2,998,817, 3,390,67, 3,67,081, 3,587,568, 3,653,083, 4,068, 334, 4,175,297, 4,193,149, 4,197,837, 4,225,989, 4,347,633, 4,391,009, and 4,472,847, and the following foreign patents: G.B. 959,103, Australia 401,767, and German 24 46 935, 29 19 438 and 28 07 038. None of the devices disclosed in those patents rocks or alternately moves the patient supported thereon to further distribute the patient's body weight over additional air cushions or cells or to alternately relieve the pressure under portions of the patient's body.

There are also a number of patents which disclose an inflatable device other than an air mattress or cushion but which also involves alternately supplying air to a set of cells and then to another set of cells. Those patents include U.S. Pat. Nos. 1,147,560, 3,595,223, and 3,867,732, and G.B. Patent No. 1,405,333. Of those patents, only the British patent discloses the movement of the body with changes in air pressure in the cells of the device. None of those references discloses an apparatus which is adaptable for use in a low air loss patient support system.

British Patent No. 946,831 discloses an air mattress having inflatable elongated bags which are placed side-by-side and which are in fluid communication with each other. A valve is provided in the conduit connnecting the insides of the two bags. Air is supplied to both bags in an amount sufficient to support the patient, thereby raising the patient off the bed or other surface on which the air mattress rests. Any imbalance of the weight distribution of the patient causes the air to be driven from one bag to the other, allowing the patient to turn toward the direction of the now deflated bag. An automatic changeover valve, the details of which are not shown, is said to then inflate the deflated bag while deflating the bag which was originally inflated, thereby rocking the patient in the other direction. That device is limited in its ability to prevent bed sores because when the patient rocks onto the deflated bag, there is insufficient air to support the patient up off the bed or other surface on which the air mattress rests, resulting in pressure being exerted against the patient's skin which is essentially the same as the pressure that would have been exerted by the board or other surface without the air mattress. Even if there were enough air left in the deflated bag to support the patient, if the air mattress were constructed in a low air loss configuration, the air remaining in the bag would be slowly lost from the bag until the patient rested directly on the bed or other surface with the same result. Finally, that device is not adaptable for use on a bed having hinged sections corresponding to the parts of the patient's body lying on the bed so that the angle of inclination of the various portions of the bed can be adjusted for the patient's comfort.

The present invention represents an improved apparatus over the prior art. It is characterized by a number of advantages which increase its utility over the prior art devices, including its flexibility of use, its ability to maintain air pressure, the ability to quickly and easily replace one or more of the air bags while the apparatus is in operation, and the ease of adjustment of the air pressure in the air bags.

It is, therefore, an object of the present invention to provide a low air loss bed comprising a frame, a first set of substantially rectangular gas permeable air bags for supporting a patient thereon mounted transversely on the frame, a second set of substantially rectangular gas permeable air bags for supporting a patient thereon mounted transversely on the frame, means for connecting each of the air bags to a gas source, means integral with each of the air bags of the first set of air bags for moving the patient supported thereon toward a first side of the frame when each of the air bags in the first portion is inflated, means integral with each of the air bags of the second set of air bags for moving the patient supported thereon toward a second side of the frame when the air bags in the first set of air bags are deflated and the air bags of the second set of air bags are inflated, and integral means on each of the air bags for retaining the patient alternately supported on the first or second set of air bags when the patient is moved toward the first or second sides of the frame.

It is a further object of the present invention to provide an air bed, the air pressure of which can be quickly and conveniently set to support a patient of known body weight by simply setting the valves regulating the amount of air flowing from the air source.

Another object of the present invention is to provide a means for selectively routing an additional flow of gas from the gas source directly to the gas manifold supplying the set of air bags supporting the heavier portions of the patient without routing the flow through the gas flow controlling means.

Another object of the present invention is to provide a low air loss bed which is self-contained in that it requires no out-board gas source and is, therefore, more compact and convenient to use.

Another object of the present invention is to provide a low air loss bed upon which a patient may be maintained and which allows accurate monitoring of patient body weight.

Another object of the present invention is to provide a low air loss bed having an integral gas source which can be raised, lowered or tipped, and which allows the raising or lowering of a portion of the bed.

Another object of the present invention is to provide a low air loss gas permeable air bag which is comprised of a substantially rectangular enclosure constructed of a gas permeable material means for connecting the inside of the enclosure with a source of gas for inflating said enclosure, means for releasably securing the enclosure to a low air loss bed, integral means for moving a patient resting on the top surface of the rectangular enclosure towards the end thereof when the enclosure is inflated, and integral means at the end of the rectangular enclosure toward which the patient is moved for retaining the patient on the top surface of the enclosure.

Another object of the present invention is to provide an air bag with a single opening which can be quickly and easily detached from an air bed to allow the easy replacement of the air bag, even while the bed is in operation.

Another object of the present invention is to provide a low air loss bed capable of rolling a patient back and forth on the bed while safely retaining the patient thereon.

Another object of the present invention is to provide a low air loss bed capable of alternately moving a patient in one direction and then in a second direction which is divided into at least three sections approximately corresponding to the portions of the body of the patient lying thereon which are hinged to each other and provided with means for raising and lowering the sections corresponding to the body of the patient to provide increased comfort and therapeutic value to the patient while the patient is being alternately moved in the first and second directions on the bed.

Another object of the present invention is to provide a low air loss bed capable of alternately rolling a portion of a patient in one direction and then in a second direction while retaining another portion of the patient in a relatively fixed position.

Other objects and advantages will be apparent to those of skill in the art from the following disclosure.

SUMMARY OF THE INVENTION

These objects and advantages are accomplished in the present invention by providing a frame with a source of gas mounted thereon. A plurality of sets of gas permeable air bags are mounted on the frame, each set of air bags corresponding to a portion of a patient to be supported in prone position on the bed. Each of a plurality of separate gas manifolds communicates with the gas source and one et of the sets of air bags. Also provided is a means for separately changing the amount of gas delivered by the gas source to each of the gas manifolds, thereby varying the amount of support provided for each portion of the patient.

Also provided is an air bag for use on a low air loss bed having a plurality of transversely mounted air bags mounted thereon comprising an enclosure for supporting a patient and distributing pressure over the body of the patient to prevent pressure points and means for connecting the inside of the enclosure with a source of gas for inflating the enclosure with gas. The enclosure is provided with means for securing the enclosure to a low air loss bed and means for moving a patient supported thereon toward one end of the enclosure when the air bag is inflated. The air bag is also provided with integral means for retaining the patient supported on the top surface of the enclosure when the patient is moved toward the end of the enclosure.

Also provided is a low air loss bed comprising a bed frame having a source of gas and a plurality of sets of gas permeable air bags mounted thereto. Separate gas manifolds communicate with the interior of the air bags on one set of the sets of air bags and the gas source. An air control box is mounted to the bed frame and interposed in the flow of air from the gas source to the gas manifolds, and is provided with individually adjustable valves for changing the amount of gas delivered to each of the gas manifolds. The air control box is also provided with means operable to selectively open all of the valves to the atmosphere, allowing the gas to escape from each of the sets of air bags, to collapse the air bags with the result that the patient is supported by the frame of the air bed rather than the air bags.

Also provided with a low air loss bed having a bed frame and a plurality of sets of air bags mounted thereto with a plurality of-gas manifolds communicating separately with the gas source and the interior of the air bags. An air control box is mounted to the bed frame in fluid connection with the gas source and the gas manifolds, and is provided with valves which are individually adjustable to change the amount of the flow from the gas source through the air control box to each of the gas manifolds. The air control box is also provided with means operable to simultaneously fully open the valves to cause the air bags to fully inflate.

Also provided is a low air loss bed having a frame and a plurality of sets of air bags mounted thereto with a plurality of gas manifolds communicating separately with the gas source and the interior of the air bags. An air control box is also mounted on the frame, the interior of the air control box communicating with the gas manifolds and the gas source and having means therein for separately changing the amount of gas delivered by the gas source to each of the gas manifolds. The air control box is also provided with means operable to heat the gas flowing through the air control box and with means operable to switch the heating means on and off in response to the temperature in the air control box. Also provided is means having a sensor in one of the gas manifolds which is operable to selectively control the heating means, the means operable to switch the heating means on and off in response to the temperature in the air control box being operable at a predetermined temperature.

Also provided is a low air loss bed comprising a frame, a first set of air bags for supporting a patient thereon mounted transversely on the frame, a second set of air bags for supporting a patient thereon mounted transversely on the frame, means for connecting each of the air bags to a gas source, each of the air bags of said first set of air bags having means integral therewith for moving the patient supported thereon toward a first side of the frame when the air bags in the first set of air bags is inflated, each of the second set of air bags having means integral therewith for moving the patient supported thereon toward the second side of the frame when the air bags in the second set of air bags is inflated and the air bags in the first set of air bags is deflated, and means on the air bags for retaining the patient supported thereon when the patient is moved toward the respective first and second sides of the frame.

DETAILED DESCRIPTION OF THE PREFERRED EMBODIMENTS

Figure 1:
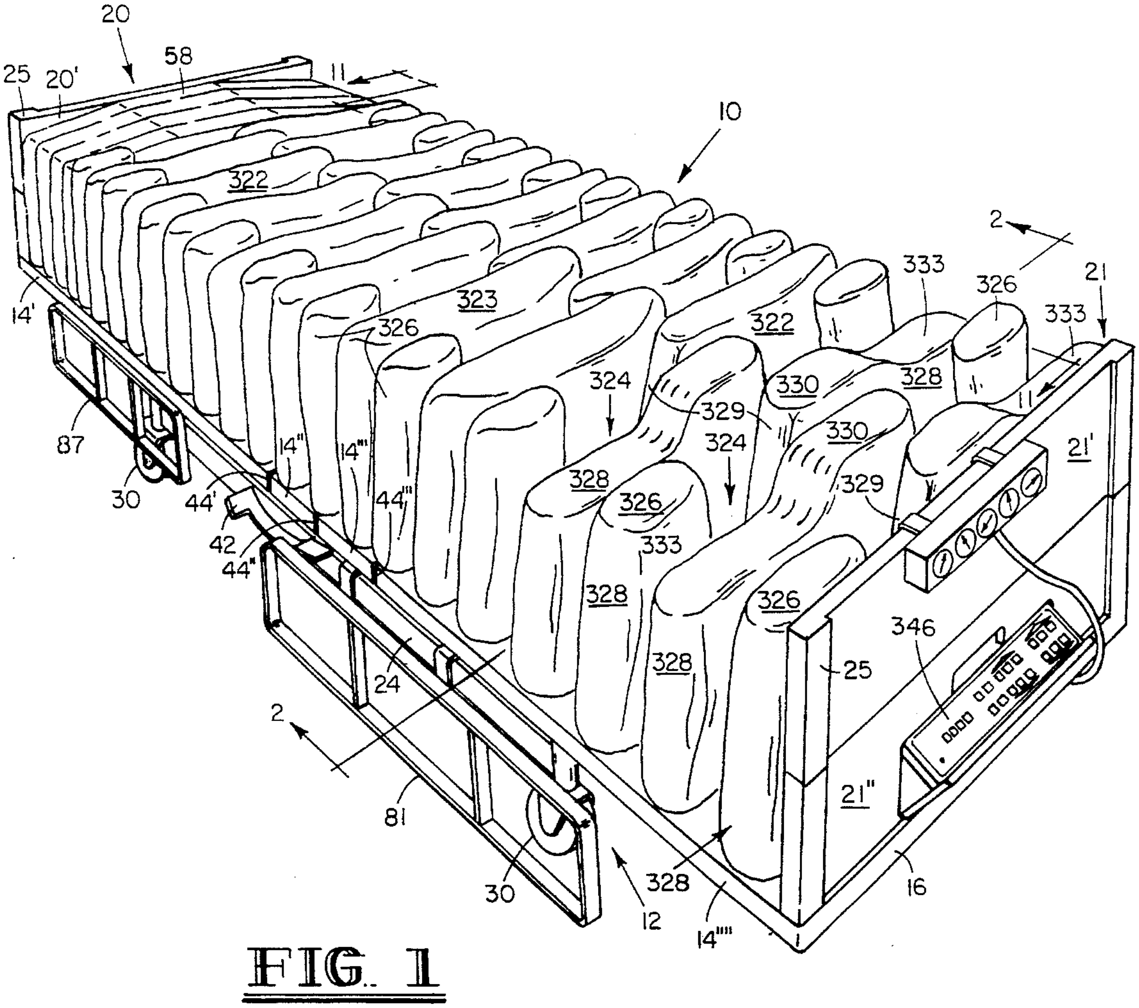
FIG. 1 is a perspective view of a presently preferred embodiment of the low air loss bed of the present invention.

Referring to FIG. 1, there is shown a bed 10 including a frame 12. The frame 12 is comprised of a plurality of sections 14', 14", 14'" and 14"", hinged at the points 44', 44" and 44'", and end members 16. Cross-members 18 (FIGS. 6 and 7) and braces 19 (FIG. 7) are provided for additional rigidity. The frame 12 is provided with headboard 20 at one end and a foot board 21 at the other end. The respective head 20 and foot 21 boards are actually constructed of two boards, 20' and 20", and 21' and 21", respectively, which are stacked one on top of the other by the vertical slats 25 on which the boards 20', 20", 21' and 21" are mounted.

Figure 6:
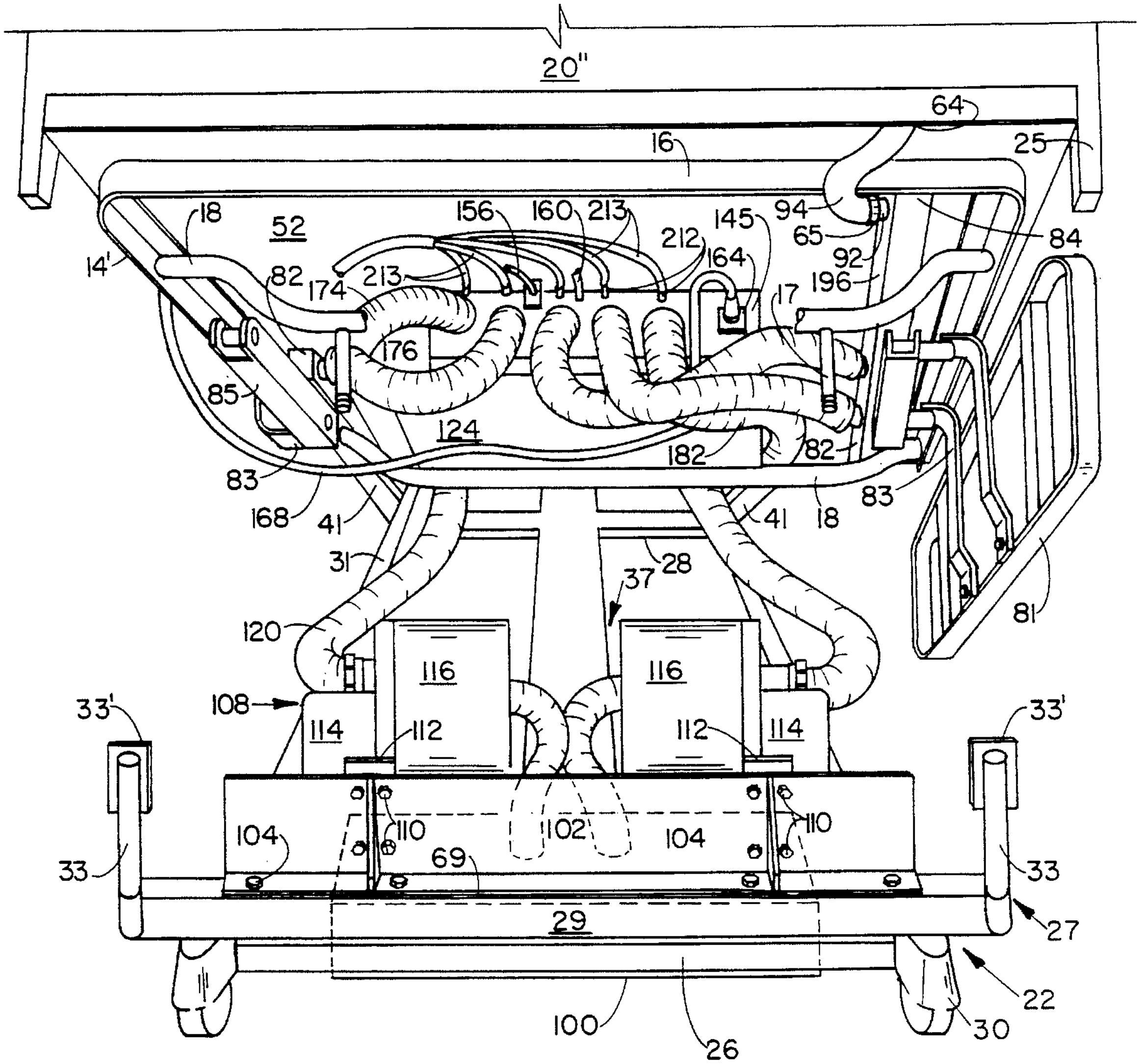
FIG. 6 is an end view of the low air loss bed of FIG. 1 with the head portion raised to show the construction of the frame and the components mounted thereto.
Figure 7:
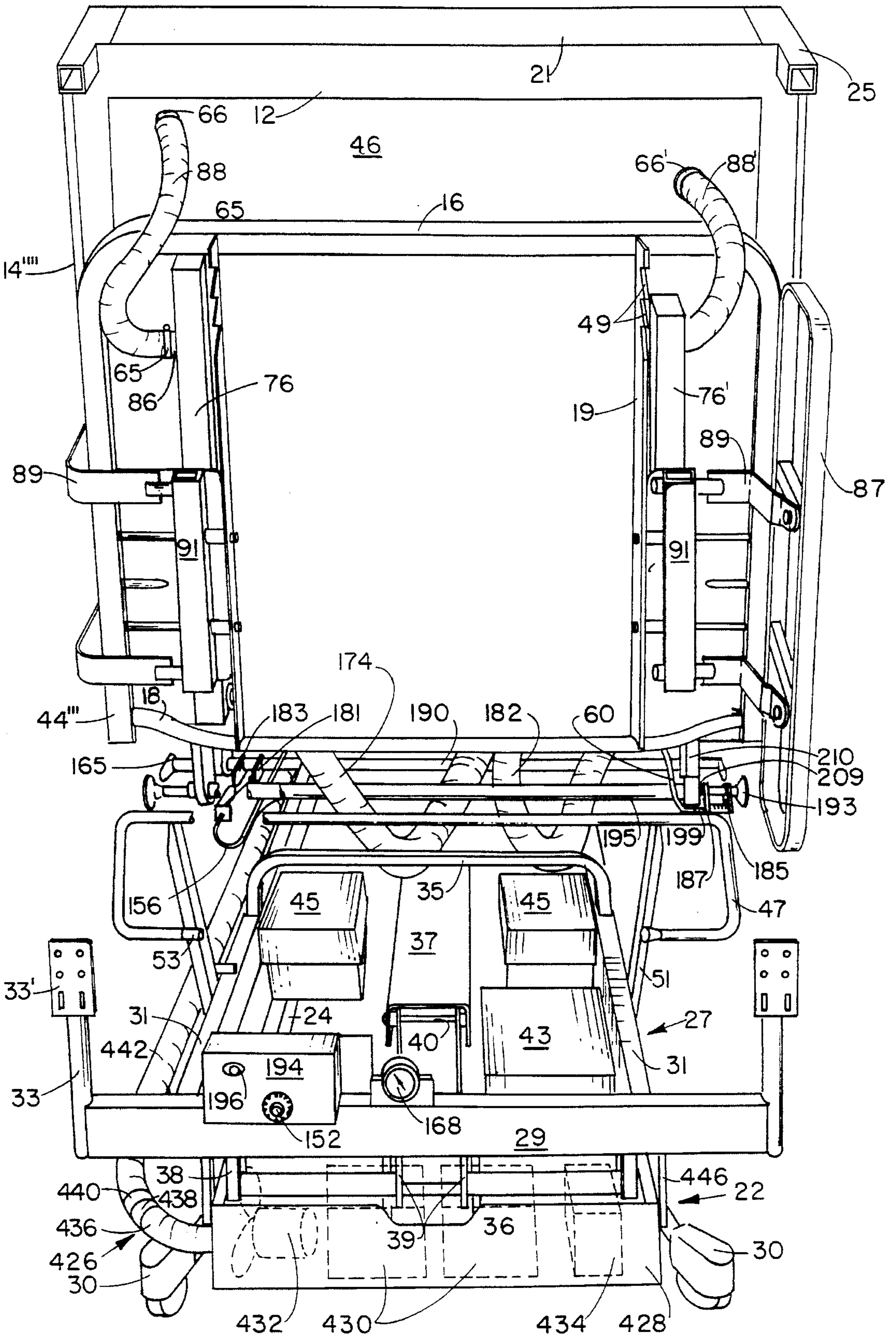
FIG. 7 is an end view of the low air loss bed of FIG. 1 with the foot portion raised to show the construction of the frame and the components mounted thereto.

A separate sub-frame, indicated generally at reference numeral 27 in FIGS. 6 and 7, is mounted on a base 22 comprised of longitudinal beams 24, cross-beams 26 and cross-member 28 by means of a vertical height adjustment mechanism as will be described. The base 22 is mounted on casters 30 at the corners of the base 22. A foot pedal 42 is provided for braking and steering the casters 30.

Sub-frame 27 is comprised of cross beams 29, hoop brace 35, and longitudinal beams 31 (see FIGS. 6 and 7). Sub-frame 27 is provided at the corners with uprights 33, having tabs 33' thereon, for mounting of IV bottles and other equipment. Means is provided for raising and lowering the sub-frame 27 relative to the base 22 in the form of a conventional vertical height adjustment mechanism, not all of the details of which are shown. Height is adjusted by rotation of axle 36 under influence of a power screw, hidden from view in FIG. 7 by drive tunnel beam which is powered by a motor which is also hidden from view. Axle 36 is journaled in the ears 38 which are mounted to the longitudinal beams 31 of sub-frame 27. Power is transferred from the power screw to axle 36 by means of eccentric levers 39, the axle 40 of which is journaled in drive tunnel beam 37. Sub-frame 27 rises on levers which are pivotally mounted to the cross-beams of base 22. The levers and the members on which they are mounted are hidden from view in FIGS. 6 and 7 by cross beam 29.

The section 14" of frame 12 is mounted to the longitudinal beams 31 of sub-frame 27 by support members 41 (see FIG. 6). The section 14' of frame 12, with the head baseboard 52 thereon, and the section 14"" of frame 12, with foot baseboard 46 thereon, pivot upwardly from the horizontal at the hinges 44' and 44"", respectively. The purpose of that pivoting is to provide for the adjustment of the angle of inclination of the various parts of the body of the patient, and the details of that pivoting are known in the art and are not shown for purposes of clarity, although the motors are located within the boxes shown at 45 and are controlled from control panel 346, and the circuitry for those functions is contained within box 43 (FIG. 7) and is explained in more detail below. Supports 17 are provided on the cross member 18 under head baseboard 52 which rest on the longitudinal beams 31 of sub-frame 27 when head baseboard 52 is horizontal. When foot baseboard 46 is raised (FIG. 7), cross-bar 47 rises therewith by means of the pivoting connection created by cross-bar 47 and the notches 49 in brace 19 (cross-bar 47 is shown detached from braces 19 in FIG. 7 for purposes of clarity). The sets of notches 49 provide means for adjusting the height to which cross-bar 47 can be raised, foot baseboard 46 pivoting upwardly on brackets 51 which are pivotally mounted to the longitudinal beams 31 of sub-frame 27. The tips 53 of cross-bar 47 rest on longitudinal beam 31 when foot baseboard 46 is lowered to the horizontal.

Side rails 81 are mounted to brackets 83 (see FIG. 6) which are pivotally mounted to the mounting brackets 85 mounted on the underside of head baseboard 52. Side rails 87 are mounted to brackets 89 (see FIG. 7), and brackets 89 are pivotally mounted to the mounting brackets 91. Mounting brackets 91 are affixed to the braces 19 on the underside of foot baseboard 46.

Figure 5A:
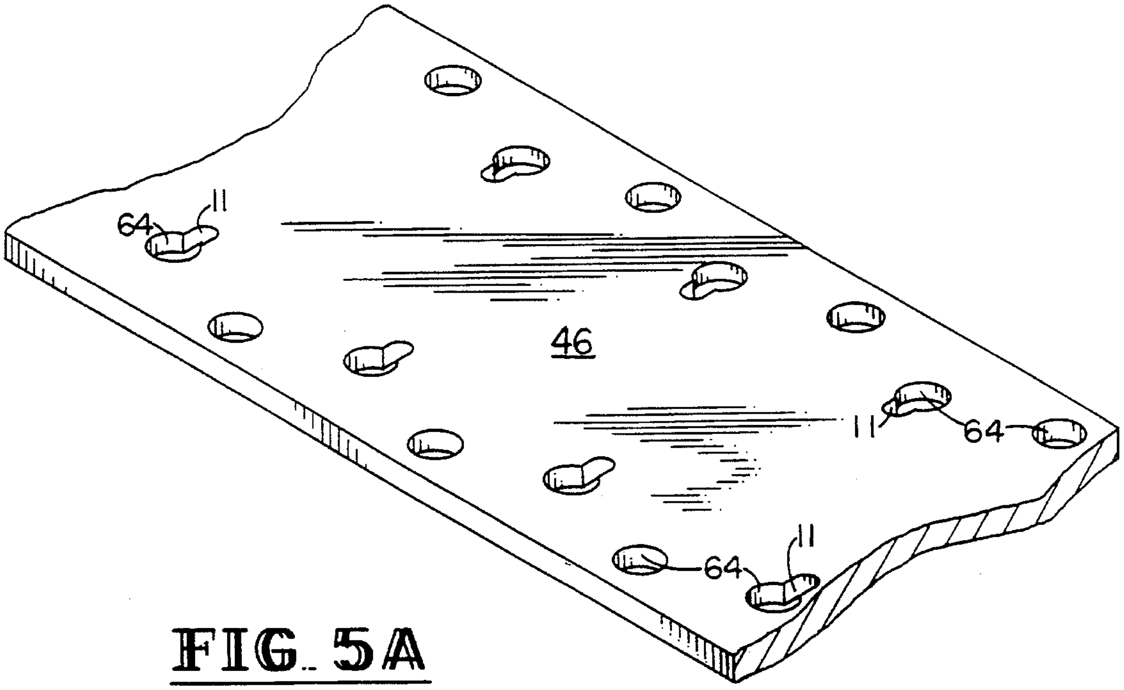
FIG. 5A is a perspective view of one of the baseboards of the low air loss bed of FIG. 1.
Figure 5B:
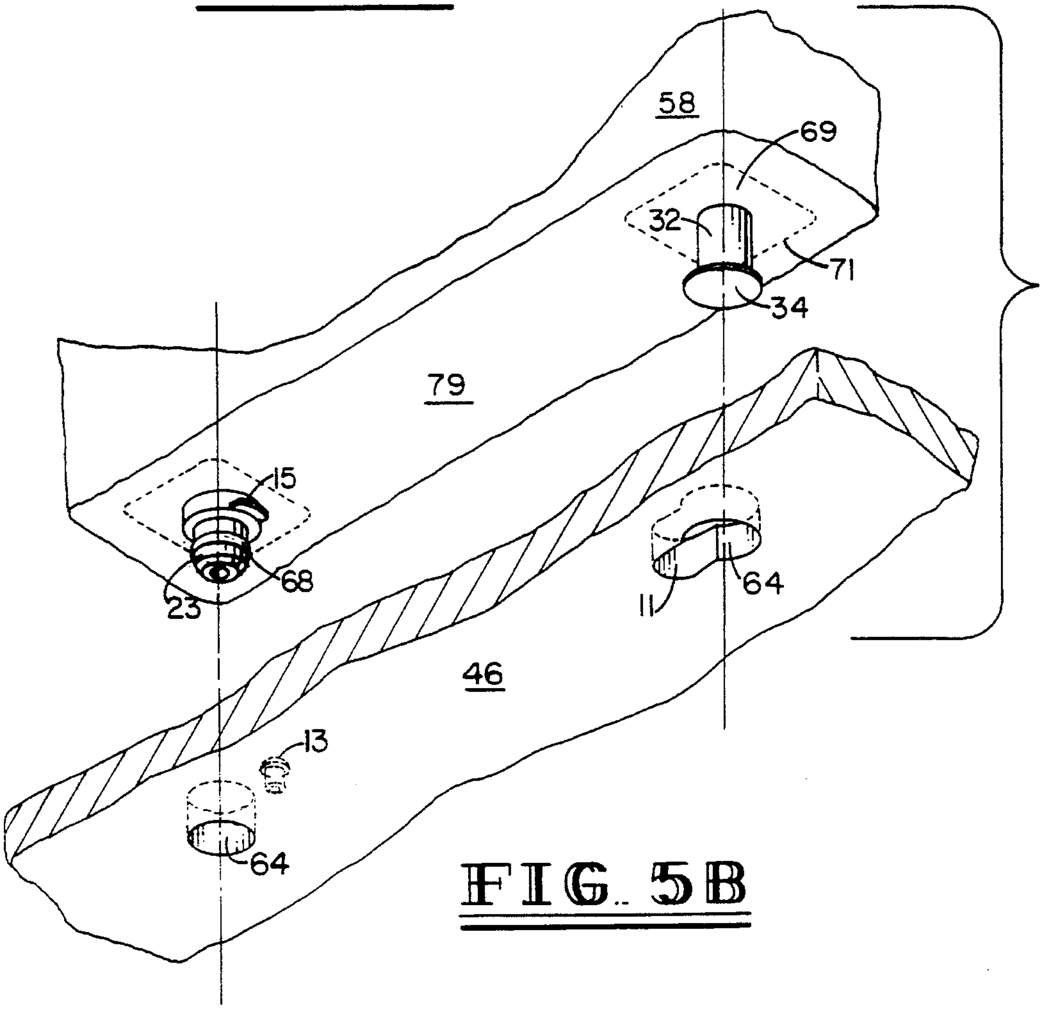
FIG. 5B is an enlarged, exploded perspective view of the underside of the baseboard of FIG. 5A, showing the baseboard partially cut away to show the details of attachment of a low air loss air bag thereto.
Figure 11:
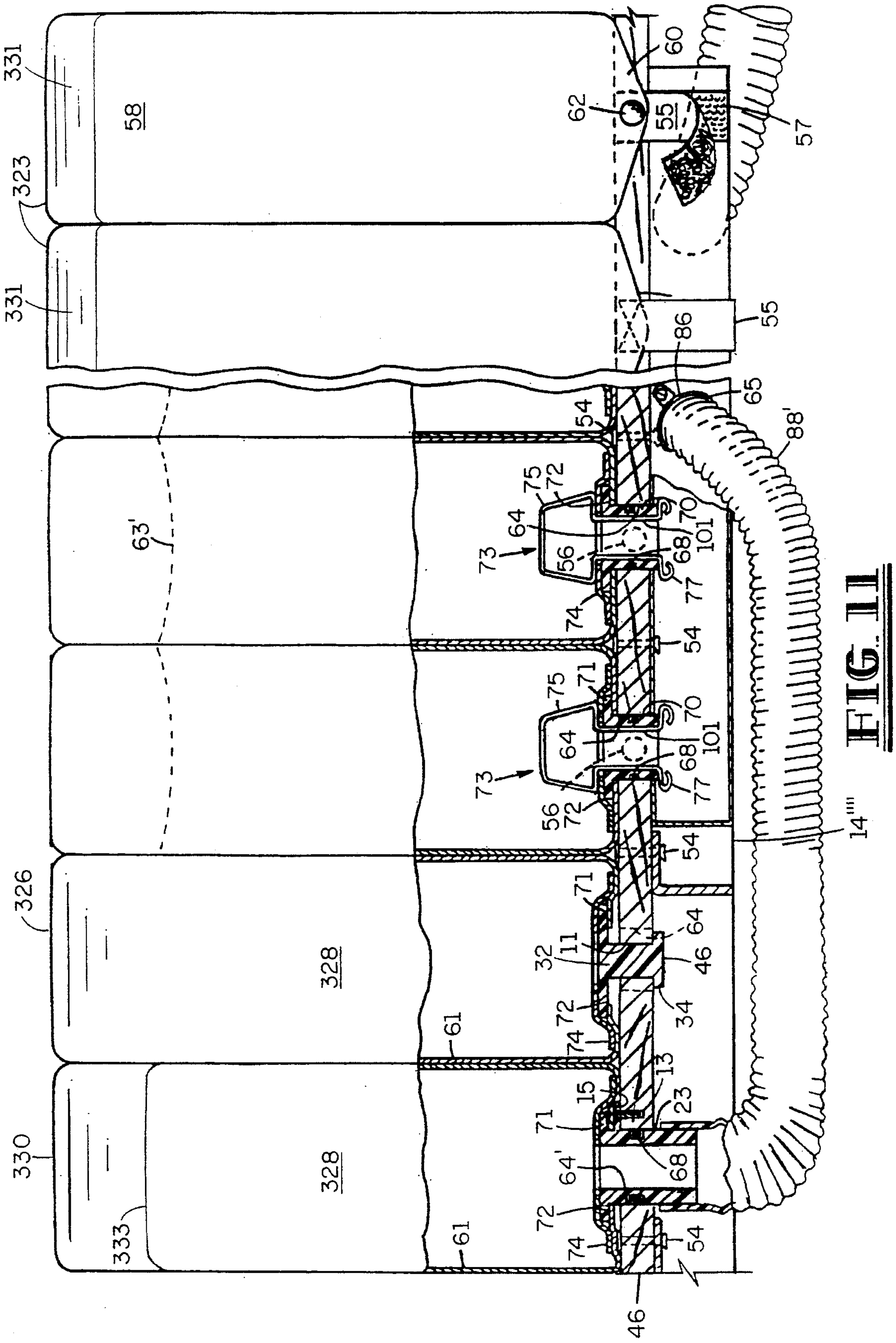
FIG. 11 is a composite, longitudinal sectional view of a portion of the foot baseboard of a low air loss bed constructed according to the teachings of the present invention taken along the lines 11—11 in FIG. 1 showing several alternate methods of attaching the air bags to the bed frame.

The frame 12 is provided with a feet baseboard 46, a leg baseboard 48, a seat baseboard 50 and a head baseboard 52 (shown in shadow lines in FIG. 3), each being mounted to the corresponding section 14', 14", 14'" and 14"" of the frame 12 by means of rivets 54 (see FIG. 11). Means is provided for releasably securing the air bags 58 to the low air loss bed 10. Referring to FIGS. 5A and 5B, there is shown a presently preferred embodiment of that releasable securing means. In FIGS. 5A and 5B, there is shown a portion of the feet baseboard 46, which is provided with holes 64 therethrough which are alternating and opposite each other along the length of the feet baseboard 46, as well as leg baseboard 48, seat baseboard 50 and head baseboard 52. Every other hole 64 is provided with a key slot 11 for receiving the post 32, having retainer 34 mounted thereon, which projects through the bottom surface 79 of air bag 58, the flange 71 of which is retained between patch 69, which is stitched to the bottom surface 79 of air bag 58, and the bottom surface 72. Air bag 58 is shown cutaway and in shadow lines in FIG. 5B for purposes of clarity. Air bag 58 is also provided with a nipple 3 of resilient polymeric plastic material having an extension tab 15 integral therewith. To releasably secure the air bag 58 to feet baseboard 46, or any of the other baseboards 48, 50, or 52, post 32 is inserted through hole 64 until retainer 34 has emerged from the bottom thereof. Post 32 is then slid into engagement with key slot 11 and retainer 34 engages the bottom side of feet baseboard 46 around the margin of hole 64 to retain air bag 58 in place on feet baseboard 46. Nipple 23 is then inserted into the hole 64 opposite the hole 64 having key slot 11 therein and rotated until extension tab 15 engages the bottom of the head of flat head screw 13 to help secure nipple 23 in place.

In an alternative embodiment, the baseboards 46, 48, 50 and 52 are provided with means for releasably securing the air bags 58 to the low air loss bed 10 in the form of male snaps 56 (FIG. 11) along their edges. The air bags 58 are provided with flaps 60, each of which is supplied with female snaps 62 which mate with male snaps 56. Flaps 60 are alternatively provided with a strip of VELCRO adherent tape 55, and the edges of baseboards 46, 48, 50 and 52 are provided with a complementary strip of the hooks for the VELCRO adherent tapes 57, to secure each air bag 58 in place. Alternatively, flap 60 and baseboards 46, 48, 50 and 52 are provided with both VELCRO adherent tapes and snap fastening means.

Figure 21:
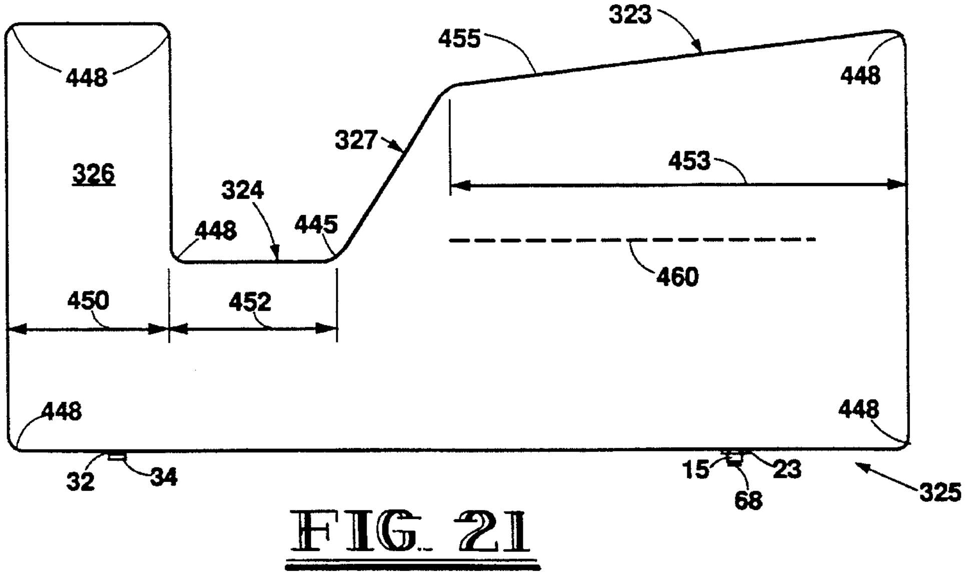
FIG. 21 is an end view of an alternative embodiment of an air bag for use on the low air loss bed of FIG. 1.

The air bags 58 are substantially rectangular in shape, and are constructed of a coated fabric or similar material through which gas, including water vapor, can move, but which water and other liquids will not penetrate. The fabric sold under the trademark "GORE-TEX" is one such suitable material. The air bags 58 can include one or more outlets for the escape of the air with which they are inflated or they can be constructed in a "low air loss" conformation. The low air loss air bag 58 can also be comprised of a composite of a gas impermeable fabric, which makes up the bottom 72 and the walls 61 of the air bag 58, and the gas permeable fabric described above, which makes up the top 63 of the air bag. The top 63, baffle 460 (see FIGS. 21–23), and walls 61 are stitched or otherwise joined at shadow lines 63'. The gas impermeable fabric is, for instance, a polymer-coated nylon. The construction, termed a low air loss air bag, allows the pressurization of the air bag 58 with a smaller flow of gas than is required to inflate air bags 58 constructed entirely of GORE-TEX fabric, which results in the possibility of maintaining sufficient pressure with just one blower 108 operating while using such low air loss air bags 58 or a combination of air bags 321, 322, 325 or 328, as will be described, with those low air loss air bags 58.

Figure 2:
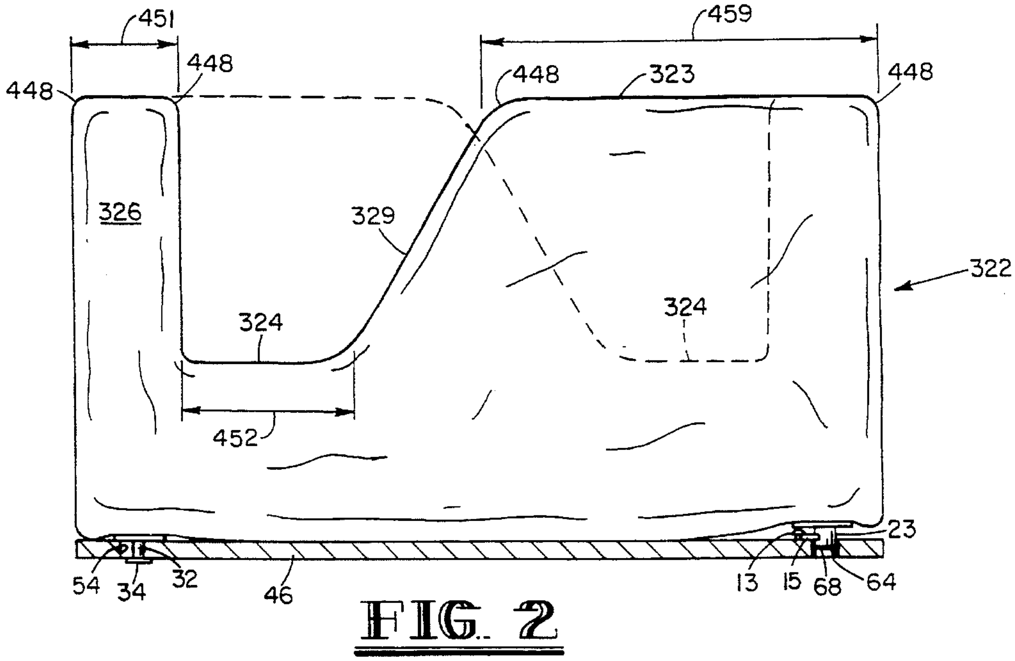
FIG. 2 is a cross-sectional view of the bed of FIG. 1, showing an air bag with a second air bag therebehind taken along the lines 2—2 in FIG. 1, the second air bag being shown in shadow lines for purposes of clarity.

Referring to FIGS. 1 and 2, air bags are shown of different conformation according to their location on the frame 12 of bed 10. For instance, the air bags mounted to the leg baseboard 8 and seat baseboard 50 are designated at reference numeral 322. Air bags 321, 322, 325 and 328 are constructed in the form of a substantially rectangular enclosure, at least the top surface 323 of which is constructed of gas permeable material such as described above. Air bags 321, 322, 325 or 328 are provided with means for connecting the inside of that enclosure to a source of gas, such as the blower 108, to inflate the enclosure with gas in the form of the nipple 23 (see FIG. 2) which extends through the baseboard 50 into the seat gas manifold 80 mounted thereto. Air bag 321, 322 325 or 328 is also provided with means for releasably securing the enclosure to the low air loss bed 10 in the form of the post 32 and retainer 34 described above. Means is provided for moving a patient 348 supported on air bags 322, 325 or 328 toward one side of frame 12 when air bags 322, 325 or 328 are inflated and for retaining the patient 348 on the top surface 323 of air bags 322, 325 or 328 when patient 348 is rolled or rocked towards one side of frame 12 or the other. The means for moving patient 348 supported on air bags 322, 325 or 328 toward one side of frame 12 when the air bags 322, 325 or 328 are inflated comprises a cutout 324 in the top 323 of the substantially rectangular shape of each of the air bags 322, 325 or 328.

Each air bag 322, 325 or 328 is also provided with means for retaining a patient 348 on the top surface 323 of the air bag 322, 325 or 328 when patient 348 is rolled toward the side of frame 12 by the inflation of air bags 322, 325 or 328 in the form of a pillar 326 which is integral with each air bag 322, 325 or 328 and which, when inflated, projects upwardly to form the end and corner of the substantially rectangular enclosure of air bag 322, 325 or 328. The means for retaining patient 348 on the top 323 of air bags 322, 325 or 328 can also take the form of a large foam cushion (not shown) mounted to side rails 81 and 87 on both sides of bed frame 12. That cushion can be detachably mounted to side rails 81 and 87, or can be split so that a portion mounts to said rail 81 and a portion mounts to side rail 87. The air pressure in air bags 322, 325 or 328 is then adjusted, as will be explained, until patient 348 is rocked gently against that foam cushion on one side of bed frame 12 and then back toward the other side of bed frame 12.

As shown in FIG. 1, a plurality of air bags 58, 321, 322, 325 and/or 328 is mounted transversely on the frame 12 of bed 10. The air bags 322, 325 or 328 are divided into a first set in which the pillar 326 and cutout 324 are closer to one side of bed frame 12 than the other and a second set of air bags 322, 325 or 328 in which the pillar 326 and cutout 324 are closer to the second side of the bed frame 12. The air bags 322, 325 or 328 of the first set and the air bags 322, 325 or 328 of the second set alternate with each other along the length of baseboards 46, 48, 50, and 52. As will be explained, the first set of air bags 322, 325 or 328 is inflated with air from blower 108, thereby causing the patient 348 supported on the air bags 322 to be rolled toward the first side of bed frame 12 and then deflated while the second set of air bags 322, 325 or 328 is inflated, thereby moving the patient 348 supported thereon toward the other side of bed frame 12 (see FIG. 10).

Figure 10A:
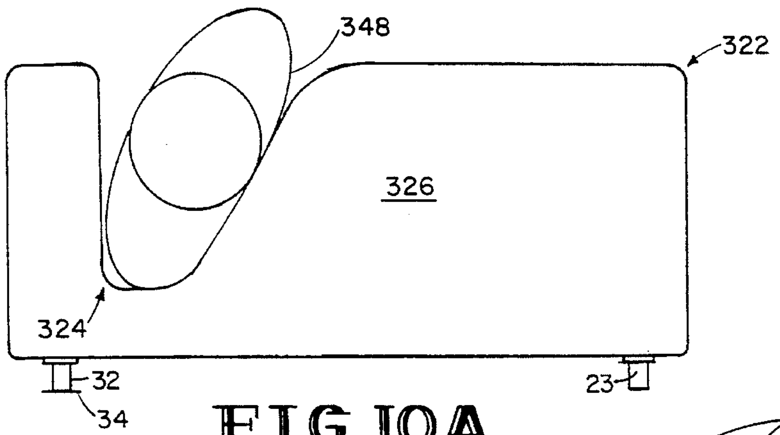
FIGS. 10A–10D are an end view of a patient supported upon the top surface of the air bags of the low air loss bed of the present invention as that patient (10D), is rocked toward one side of the frame of the low air loss bed (10A), then toward the other side (10C) or supported on the air bags when all air bags are fully inflated (FIG. 10B).
Figure 10B:
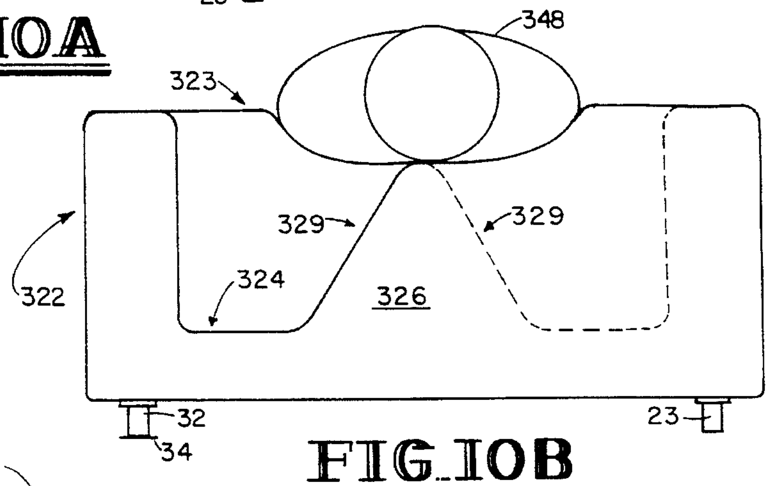
Figure 10C:
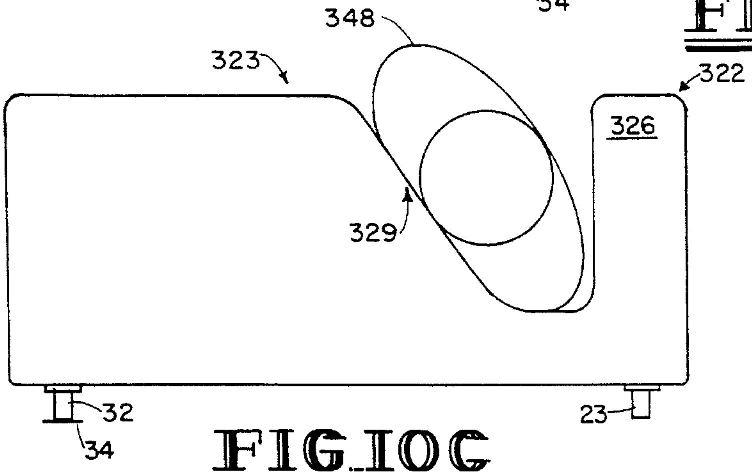
Figure 10D:
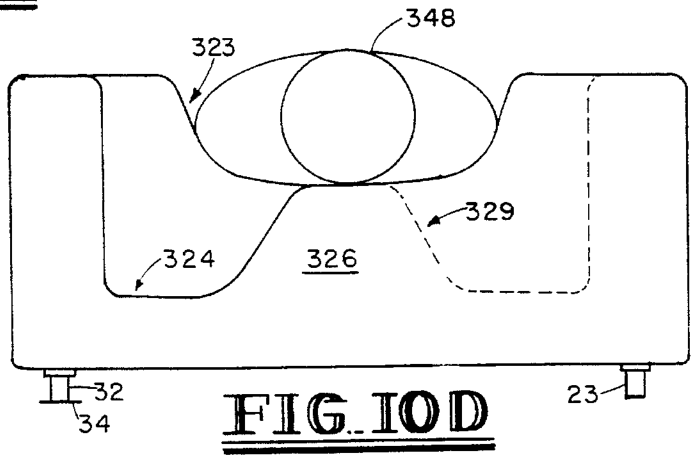
Figure 23:
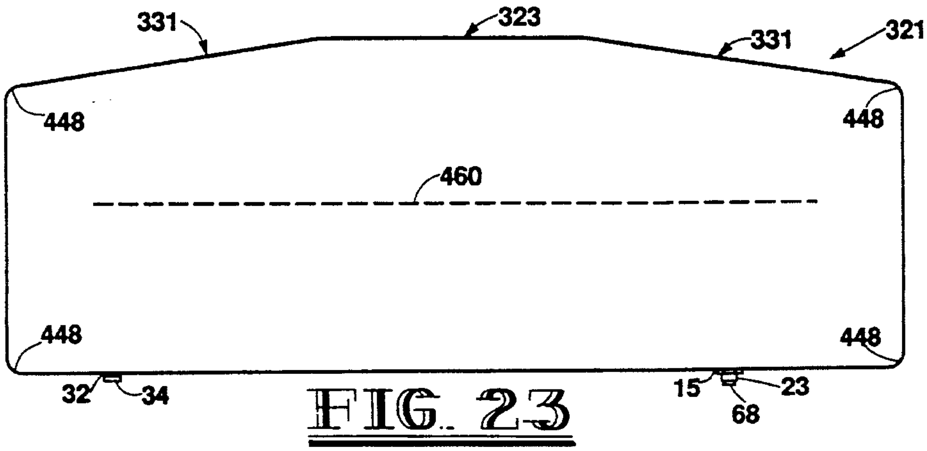
FIG. 23 is an end view of another one of the air bags for use on the low air loss bed of FIG. 1.

The air bags 58, or 321 which are mounted on head baseboard 52 are provided with a flat top surface 323 so that the head of patient 348 is retained in a relatively constant position while the body of patient 348 is alternately rolled first toward one side of the bed frame 12 and then back toward the other side of bed frame 12. Referring to FIG. 23, an air bag 321 is shown for use under the head of patient 348. Air bag 321 is substantially rectangular in shape, but is provided with a slanted top surface 323 in the area 331 adjacent corners 448. The height of air bag 321 is less than the height of air bags 58, 322, 325 and 328 because when patient 348 lies upon air bags 58, 322, 325 and/or 328, the heavier portions, i.e., the portions of the body other than the head, sink into those air bags 58, 322, 325 and/or 328 as shown in FIG. 10D. When the patient 348 sinks into air bags 58, 322, 325 and/or 328, the head rests evenly on air bags 321 because the head does not sink into air bags 321 as far as the other portions of the body.

The air bags 328 mounted on the foot baseboard 46 and the air bags 328 mounted on a portion of leg baseboard 48 are also provided with a cutout 324 and pillar 326 as described for the air bags 322. Additionally, air bags 328 are provided with a hump 330 so that the legs of patient 348 are relatively restrained from movement during the alternate back and forth movement of patient 348, thereby helping to retain the patient 348 on the top surface 323 of air bags 58, 321, 322, 325 and 328 as well as helping to distribute the pressure exerted against the skin of patient 348 over an increased area.

Figure 22:
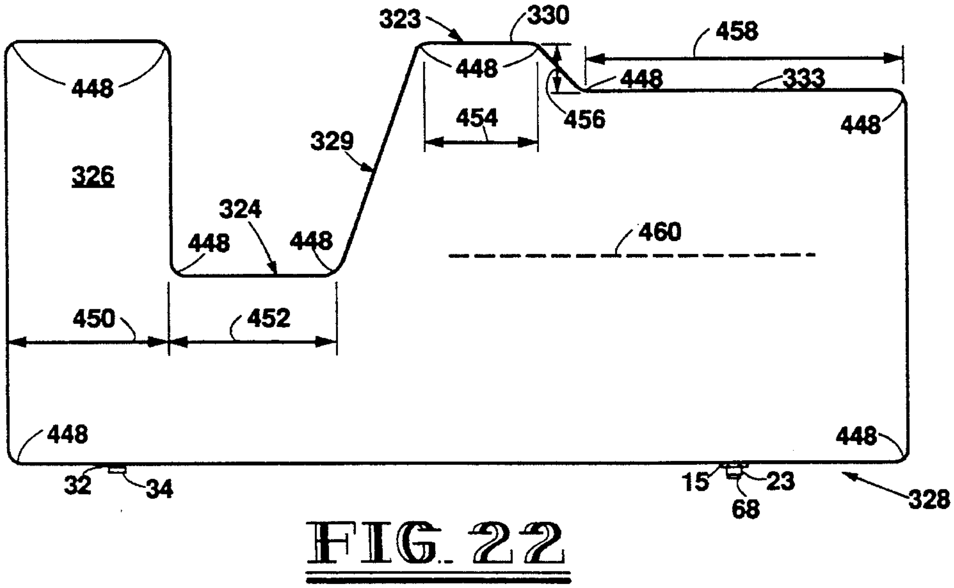
FIG. 22 is an end view of one of the air bags for use on the low air loss bed of FIG. 1.

Referring to FIG. 22, there is shown an end view of an air bag 328 having hump 330 formed in the top surface 323 thereof. As can be seen, when air bag 328 is inflated, hump 330 and pillar 326 project upwardly to help prevent the rolling of patient 348 too far to one side of bed frame 12 or the other. An alternative construction of air bag 322 is shown at reference numeral 325 in FIG. 21. Air bag 325 is provided with cutout 324 of approximately the same depth as the cutout 324 of air bags 322 and 328, but the slope of the top surface 323 in the area 327 is less than the slope of the top surface 323 in the area 329 of air bags 322 and 328. Air bag 325, in conjunction with the adjustment of the air pressure in the air bags 58, 321, 322 and/or 328, can be used under different portions of the body of patient 348 to increase or decrease the extent and speed with which patient 348 is rolled from one side of bed frame 12 to the other. For instance, air bag 325 is particularly well-suited for use under the shoulders of a patient 348.

As noted above, all of the air bags 58, 321, 322, 325 and 328 are substantially rectangular in shape with dimensions of approximately 18 ×39 inches. Each is provided with a baffle 460 attached to side walls 61 which holds the side walls 61 against bowing when the air bag 58, 321, 322, 325 or 328 is inflated. Each of the corners 448 has a radius of curvature of approximately three inches, and the depth of-cutout 324 is approximately ten inches. The dimension of pillar 326 of air bags 325 and 328 in the direction shown by line 450 is approximately seven inches, as is the dimension of cutout 324 in the direction shown by line 452. The dimension of pillar 326 of air bag 322 in the direction shown by line 451 is approximately twelve inches. The dimension of the top surface 323 of air bag 325 along line 453 is approximately twenty inches, and that top surface 323 drops off into cutout 324 in a curve 455 of approximately a six inch radius. Referring to FIG. 2, the dimension of the top surface 323 along line 458 is approximately nineteen inches. The dimension of hump 330 on air bag 328 in the direction shown by line 454 is approximately five inches, and in the direction shown by line 456, the dimension is approximately two inches. The dimension of surface 333, as shown by line 458 is approximately fourteen inches.

In an alternative construction for attaching the air bags 58, 322 and 328 to the bed 10, each air bag 58 (it should be understood throughout the specification that, when reference is made to an air bag 58, the air bag could also be constructed in the low air loss conformation described above or in the conformation of an air bag 321, 322, 325 or 328) is provided with a flanged nipple 70, the flange 71 of which is retained between the bottom 72 of the air bag 58 between a patch 74 and the bottom 72 of the air bag. As described below, each air bag 58 is mounted separately on the baseboards 46, 48, 50, and 52 by snapping the female snaps 62 in the flaps 60 of each of the air bags 58 over the male snaps 56 on the edges of the baseboards 46, 48, 50, and 52 or with the VELCRO tape 55 and hooks 57, or both. When so positioned, the flanged nipple 70 on the bottom inside 72 of the air bag 58 projects through the holes 64 and 64' in the baseboards 46, 48, 50, or 52 over which the air bags 58 are positioned. An O-ring 68 is provided in a groove (not numbered) around each of the flanged nipples 70 to insure a relatively gas-tight fit between the flanged nipple 70 and the corresponding baseboard 46, 48, 50, or 52 through which the flanged nipples 70 project.

The use of individual air bags 58, 321, 322, 325 or 328 rather than a single air cushion allows the replacement of individual bags should one develop a leak, need cleaning or otherwise need attention. When it is desired to remove an individual air bag 58, 321, 322, 325 or 328 from its respective baseboard 46, 48, 50, or 52, post 32 is slid out of key slot 11 and retainer 34 and post 32 are removed from hole Nipple 23 is then rotated until extension tab 15 rotates out of engagement with screw 13 and is pulled firmly to remove it from hole 64. In the case of air bag 58, female snaps 62 at each end of the air bag 58 are disengaged from the male snaps 56 (or the VELCRO strips peeled away from each other) on the edges of baseboards 46, 48, 50 or 52, and the air bag 58 is removed by twisting flanged nipple 70 up and out of the hole 64 in the baseboard 46, 48, 50, or 52. Removal can even be accomplished while the patient is lying on the inflated air bags 58, 321, 322,325 or 328.

For additional security in holding air bags 58 onto baseboards 46, 48, 50 and 52, and to help insure a gas-tight fit between flanged nipple 70 and the respective baseboards 46, 48, 50 or 52 through which it projects, spring clip 73 (see FIG. 11) is inserted through nipple 70 of air bag 58. To insert the nipple 70 into hole 64, the hoop portion 75 of spring clip 73 is squeezed (through the fabric of air bag 58), causing the flanges 77 on the ends of the shank portion 101 of spring clip 73 to move toward each other so that they can enter the hole 64. Once inserted through the hole 64, flanges 77 spring apart, and will not permit the removal of nipple 70 from hole 64 without again squeezing the hoop portion 75 of spring clip 73.

Referring to FIG. 6, there is shown an end view of a bed constructed according to the present invention. Brace 102 is secured to the cross beam 29 of sub-frame 27 by means of bolts 104. Blowers 108 are mounted to the brace 102 by means of bolts 110 through the mounting plates 112 which are integral with the blower housing 116. A gasket, piece of plywood or particle board (not shown), or other sound and vibration dampening material is interposed between mounting plates 112 and brace 102. A strip of such material (not shown) can also be inserted between brace 102 and cross beam 29. The blowers 108 include integral permanent split capacitor electric motors 114. When motors 114 are activated, blowers 108 move air out of the blower housings 116, through the blower funnels 118 and up the blower hoses 120 to the air box funnels 122 and on into the air box 124 (see FIGS. 3 and 6).

Figure 3:
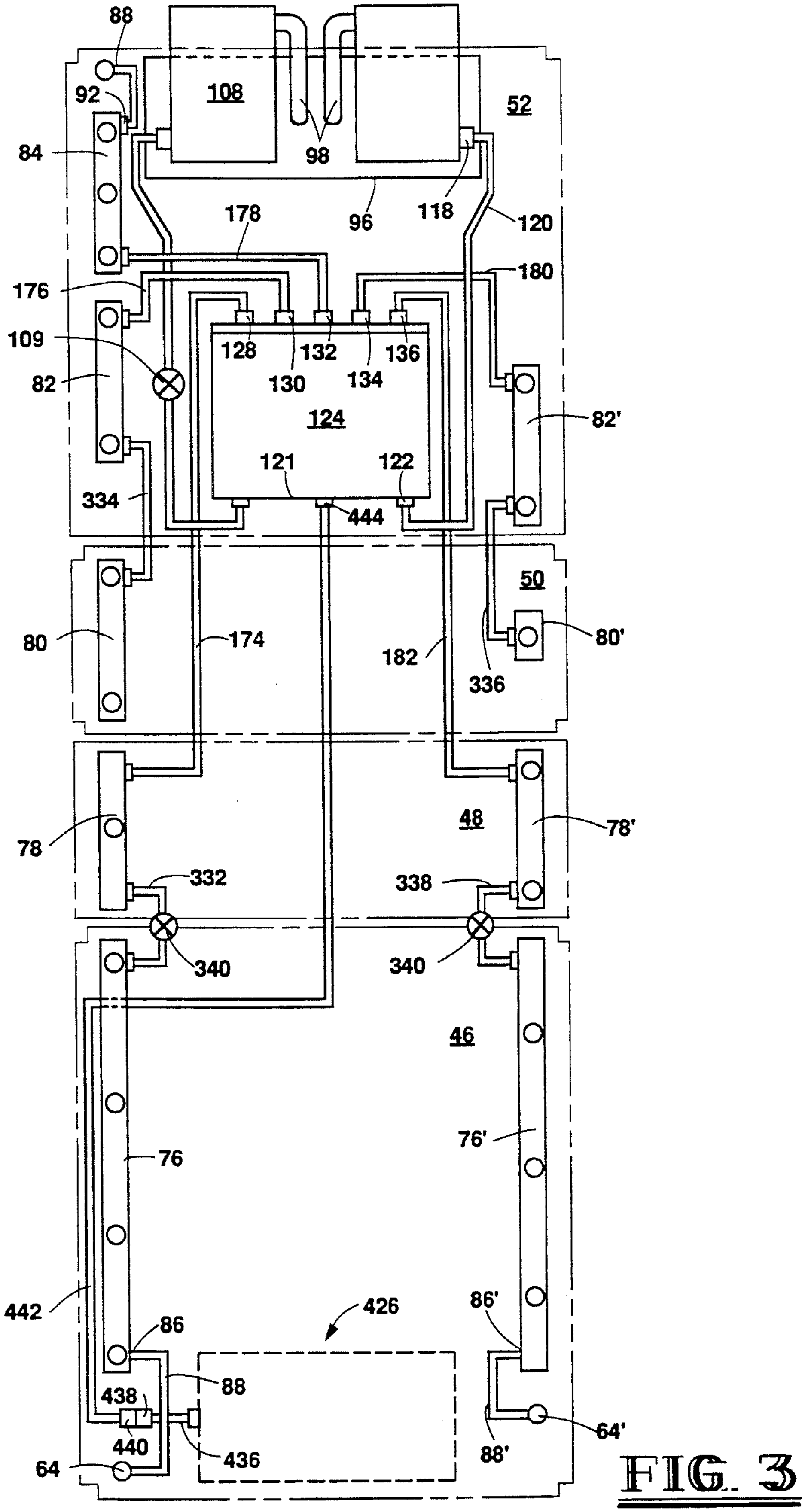
FIG. 3 is a schematic diagram of the air plumbing of the low air loss bed of FIG. 1.

Blowers 108 receive air from filter box 96 through hoses 98 (see FIG. 3). Filter box 96 is retained within a frame 100 (see FIG. 6) for ease in removal. Frame 100 is mounted to frame 27 and is, for the most part, blocked from view by cross-beam 26 of base 22 and cross beam 29 of frame 27 in FIG. 6. The second blower 108 is provided to increase the volume which is delivered to the air bags 58, thereby increasing the air pressure within air bags 58. A cover (not shown) lined with sound absorbing material can also be provided to enclose blowers 108 and thereby reduce noise.

Figure 4:
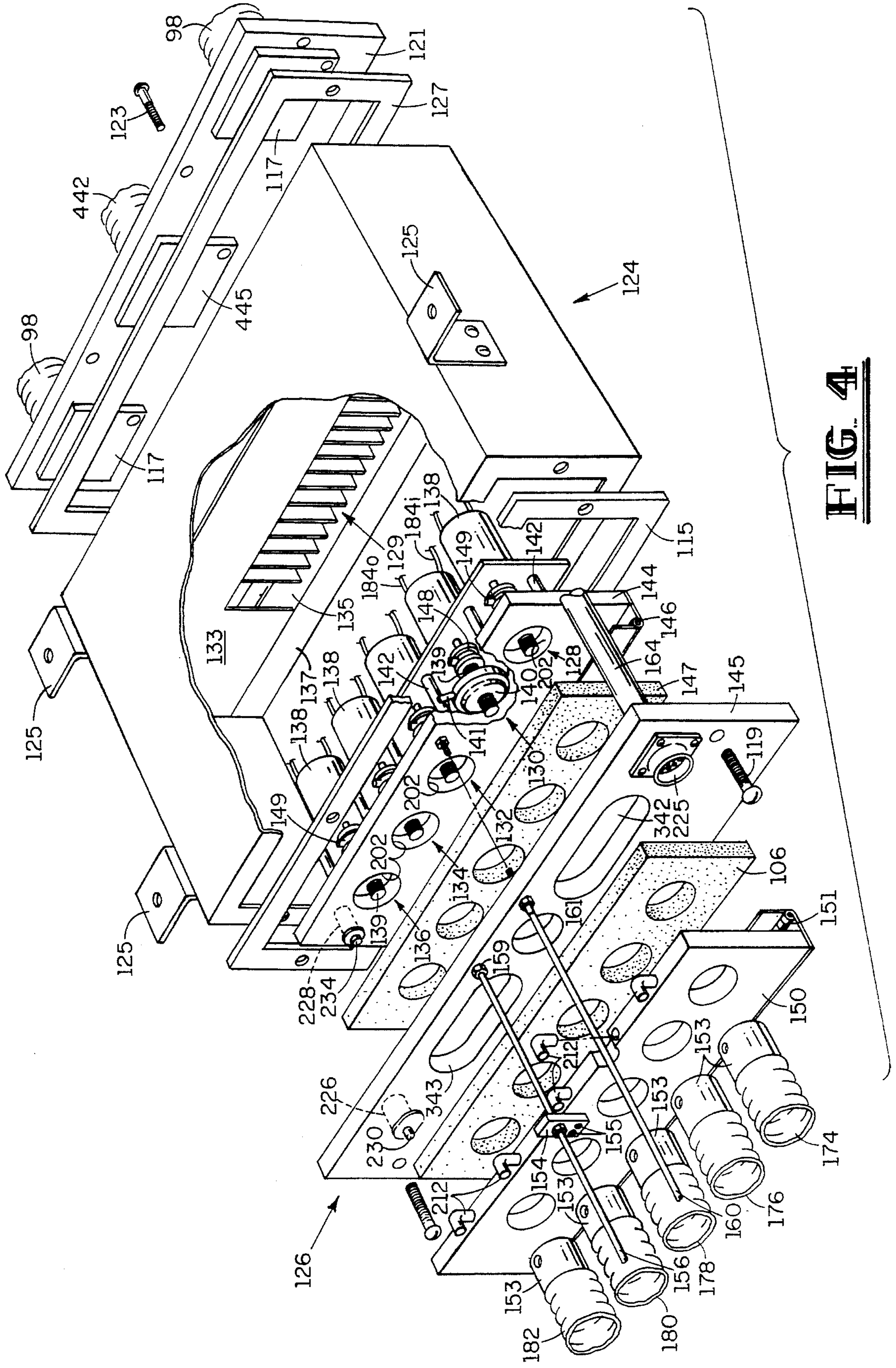
FIG. 4 is an exploded perspective view of the air control box of the low air loss bed of FIG. 1.

The air control box 124 is an airtight box mounted on the underside of head baseboard 52 by brackets 125, and is shown in more detail in FIG. 4. Air box 124 is provided with a manifold assembly 126 held to the front of air box 124 by screws 119. Manifold assembly 126 is provided with a manifold plate 145 having holes (not numbered) therein for connection to a means for changing the amount of air supplied to the air bags 58 mounted to baseboards 46, 48, 50 and 52 in the region of the feet, legs, seat, back, and head, respectively. Gasket 115 prevents the escape of air from between air box 124 and manifold plate 145. In a presently preferred embodiment, the means for changing the amount of air supplied to the air bags 58 takes the form of a plurality of valves, indicated generally at reference numerals 128, 130, 132, 134, and 136. Each of the valves 128, 130, 132, 134, and 136 is provided with a motor 138 having a nylon threaded shaft 139 (see FIGS. 4, 8, 9A and 9B) mounted on the drive shaft (not numbered) of each motor 138 and held in place by set screw 149 in collar 148. Plug 140 moves rotatably in and out along the threaded shaft 139 when limit pin 141 of plug 140 engages one or the other of the supports 142 which are immediately adjacent that particular plug 140 and which hold the motor mounting bracket 143 to the back of the full inflate plate 144.

Figure 9A:
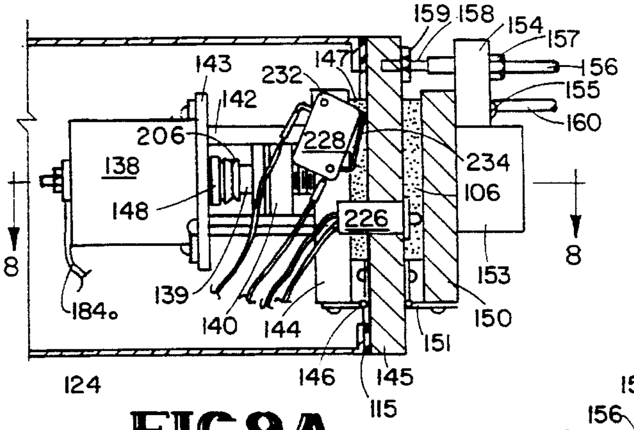
FIGS. 9A and 9B are cross-sectional views taken along the lines 9A—9A and 9B—9B, respectively, through the manifold assembly of the air box as shown in FIG. 8.
Figure 9B:
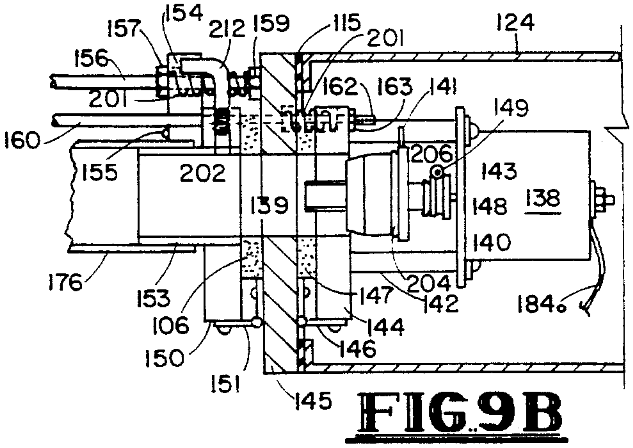

Full inflate plate 144, having openings 202 therein forming part of valves 128, 130, 132, 134, and 136, is mounted to the back of the manifold plate 145 by hinges 146 (see also FIGS. 9A and 9B). A gasket 147 is provided to prevent the escape of air from between the full inflate plate 144 and manifold plate 145. The motors 138 are not provided with limit switches, the movement of plug 140 back and forth along the threaded shaft 139 of each motor 138 being limited by engagement of plug 140 with the opening 202 as plug 140 moves forward and by the engagement of the back side of plug 140 with collar 148 as plug 140 moves back on threaded shaft 139. An O-ring 204 is provided on plug 140 which is compressed between plug 140 and opening 202 as plug 140 moves forward into opening 202. Compression continues until the load on motor 138 is sufficient to cause it to bind and stop. The O-ring 206 which is provided on collar 148 operates in similar fashion when engaged by the back side of plug 140.

The binding of motors 138 by the loading of O-rings 204 and 06 facilitates the reversal of the motors 138 and direction of travel of plug 140 along threaded shaft 139 because threaded shaft 139 is not bound. Threaded shaft 139 is free to reverse direction and turn such that the load created by the compression of O-rings 204 or 206 is released by the turning of threaded shaft 139, and plug 140 will rotate with threaded shaft 139 until limit pin 141 contacts support 142, stopping the rotation of plug 140 and causing it to move along shaft 139 as it continues to turn.

A dump plate 150 is mounted on the outside of manifold plate 145 by means of hinges 151 (see also FIGS. 9A and 9B). A gasket 106 is provided to prevent the escape of air from between the manifold plate 145 and the dump plate 150. The dump plate 150 is provided with couplers 153, the interiors of which are continuous with the holes in manifold plate 145 when dump plate 150 is in the position shown in FIGS. 9A and 9B, for connection of the appropriate bed frame gas supply hoses 174, 176, 178, 180 and 183, as will be explained.

Block 154 is attached to dump plate 150 by means of screws 155, and serves as a point at which the cable 156 can be anchored, by means of nut 157, so that a line 158 can slide back and forth within cable 156 to allow the dump plate 150 to be selectively pivoted away from manifold plate 145 on hinge 151. The line 158 is secured to the manifold plate 145 by the threaded cable end and locknut 159. Line 158 is secured at its other end to the bracket 183 mounted on tube 190 (see FIG. 7). Bed frame 12 is provided with quick dump levers 165 on both sides thereof, the quick dump levers 165 being connected by tube 190 so that both levers 165 provide a remote control for operation of dump plate 150 by causing the movement of line 158 through cable 156. When either of quick dump levers 165 is moved from the position shown in FIG. 7, eccentric lever arm 181 pulls on line 158, cable 156 being anchored on bracket 183, so that line 158 moves through cable 156. The details of the anchoring of cable 156 and movement of line 158 therethrough under the influence of lever arm 181 are the same as those for the anchoring of cable 160 and movement of line 162 therethrough under the influence of lever arm 185 (see below). Movement of line 158 causes dump plate 150 to pivot away from manifold plate 145, allowing the air in air bags 58 to escape through manifolds 76, 78, 80, 82 and 84 and bed frame gas supply hoses 174, 176, 178, 180 and 182 to the atmosphere from the opening thus created between manifold plate 145 and dump plate 150 so that air bags 58 will rapidly deflate. A coil spring 201' encloses line 158 within bores (not numbered) in dump plate 150 and manifold plate 145 to bias dump plate 150 and manifold plate 145 apart.

Figure 8:
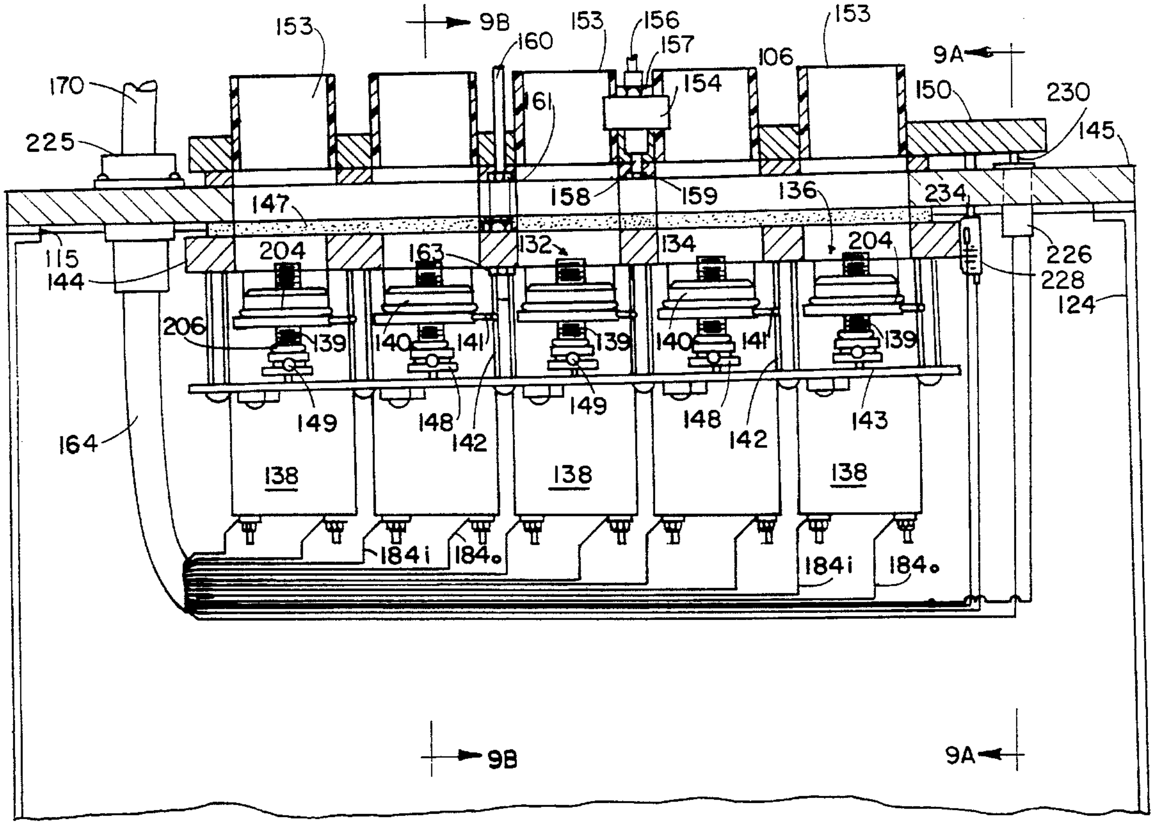
FIG. 8 is a sectional view of the air box of the low air loss bed of FIG. 1 taken along the lines 8—8 in FIG. 9A.

As is best shown on FIGS. 8 and 9B, a separate cable 160 passes through manifold plate 145 in threaded fitting 161 so that line 162 can slide back and forth therein. The line 162 is anchored in the full inflate plate 144 by means of nut 163, which allows the full inflate plate 144 to pivot away from the manifold plate 145 on hinge 146. Pivoting of full inflate plate 144 away from manifold plate 145 in this manner removes full inflate plate 144, motor mounting bracket 143, and all other parts mounted to those parts, from the flow of air to allow the unrestricted entry of the air in air box 124 into the couplers 153 of valves 128, 130, 132, 134 and 136 and on into bed frame gas supply hoses 174, 176, 178, 180 and 182, resulting in the rapid and full inflation of air bags 58 to raise the patient 348 to the position shown in FIG. 10B to facilitate patient transfer or other needs. A coil spring 201 encloses line 162 in a bore (not numbered) in manifold plate 145 and full inflate plate 144 to bias manifold plate 145 apart from full inflate plate 144.

Line 162 is anchored at its other end on lever arm 185 (FIG. 7) which is attached to the bar 195 upon which full inflate knob 193 is mounted. Bed frame 12 is provided with full inflate knobs 193 on both sides thereof, the full inflate knobs 193 being connected by bar 195 so that both control the movement of line 162 through cable 160. Cable 160 is affixed to bracket 187 by threaded cable end 199, which is mounted on the DELRIN synthetic plastic bearing 209 which is integral with support member 210 and which receives bar 195 so that rotation of full inflate knobs 193 causes line 162 to slide therein, pivoting full inflate plate 144 on hinge 146. The weight of motors 138, supports 142 and motor mounting bracket 143 bias full inflate plate 144 toward the position in which full inflate plate 144, motor mounting bracket 143, and the parts mounted thereto, are removed from the flow of gas into the couplers 153 of valves 128, 130, 132, 134 and 136. This bias allows knobs 193 to act as a release such that either of knobs 193 need only be turned enough to move the connection between line 162 and lever arm 185 out of its over center position, at which point gravity causes the plate 144 to open. Referring to FIG. 10B, patient 348 is shown lying on air bags 322 (and/or 58, 59, 321, 325 or 328) after full inflate plate 144 is opened. When knobs 193 are returned to their initial position, lever arm 185 turns to the point at which the connection between line 162 and lever arm 185 is rotated past 180° from the point at which line 162 approaches bar 195, i.e., over center. As noted below, microprocessor 240 includes an alarm buzzer (not shown), and switches (not shown) can be provided for activating that alarm when either of knobs 193 or levers 165 are used to inflate or deflate air bags 58, 321,325 and/or 328 respectively.

Air enters the air box 124 through air box funnels 122 in back plate 121 (FIG. 4). Air box funnel 122 is provided with a one-way flapper valve 117 so that air will not escape from the air box 124 when only one blower 108 is being operated. Back plate 121 is held in place on air box 124 by screws 123, and gasket 127 is provided to prevent the loss of air from between air box 124 and back plate 121.

Figure 13A:
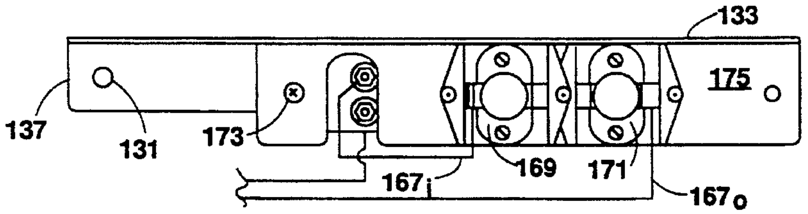
FIG. 13A and 13B are top and plan views, respectively of the heater for heating the air in the air box of the low air loss bed of FIG. 1.
Figure 13B:
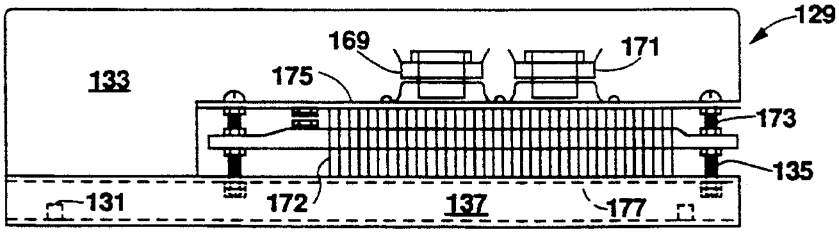

The air box 124 is provided with a heating element indicated generally at 129 and shown in FIGS. 13A and 13B.

Screws 131 secure heating element 129 in place on the bottom of air box 124, effectively partitioning air box 124 into two compartments. Because air enters the air box 124 in one compartment (i.e., behind heating element 129) and leaves the air box 124 from the other compartment, a flow of air must pass through the space 135 between bulkhead 133 and the mounting bracket 137 of heating element 129, being mixed and heated as it does.

Wires 167$_i$ and 167$_o$ provide power to heating element 129 from power distribution board 219 as will be explained, the wire 167$_i$ connecting thermostats 169 and 171 and heater strip 172 in series (see FIG. 12). Heater strip 172 is suspended in space 135 by insulated posts 173 which are secured in the flanges 175 and 177 of bulkhead 133 and mounting bracket 137, respectively. Thermostat 169 switches off at 140° F., thermostat 171 switches off at 180° F. and heater strip 172 must cool to 120° F. for thermostat 169 to come back on. Thermostat 171 is merely redundant and included for safety purposes. Both thermostats 169 and 171 reset automatically, the thermostat 171 coming back on at 140° F. Also provided is thermostat 194, which includes a sensor (not shown), located in seat manifold 80, and when the circuit containing thermostat 194 is closed due to the temperature of the air in seat manifold 80, the pilot light 196 (see FIG. 7) comes on indicating that the circuit has been completed and that heater 172 is heating the air therein. Heater 172 cannot come on unless switch 191 has been selected and one or more of the blowers 108 is operating. Thermostats 194 also includes a control 152 for adjustment of the temperature of the gas in seat manifold 80, and a thermometer gauge 168 for continuous monitoring of that temperature.

Referring to FIG. 3, the electric motors 114 of blowers 108 are switched on, forcing or pumping air (or other gases) received from filter box 96 through hoses 98 up the blower hoses 120, through one-way valves 117, and into air box 124. A valve 109 is provided to provide increased control of the air pressure in air bags 58, 59, 321, 322, 325 and 328 and to seal off one of the blowers 108 so that the bed 10 can be operated on one blower or on the blower 432 (see FIG. 7). Valve 109 is also used to restrict the flow of air one of the blowers 109 when both blowers are operating, thereby providing additional adjustability in air pressure. The air escapes from the air box 124 through valves 128, 130, 131, 134 and 136 into the respective bed frame gas supply hoses, 174, 176, 178, 180 and 182 (see FIG. 3). Bed frame gas supply hoses 174, 176, 178, 180 and 182 route the air to the manifolds 76, 78, 80, 82 and 84 and 76', 78', 80', 82' and 84'. Bed frame gas supply hose 174 is connected to leg gas manifold 78, which is connected by hose 332 to feet gas manifold 76. Bed frame gas supply hose 176 routes air to back gas manifold 82, which is connected to seat gas manifold 80 by hose 334. Bed frame gas supply hose 178 routes air to head gas manifold Bed frame gas supply hose 180 routes air to back gas manifold 82', which is connected to seat gas manifold 80' by hose 336. Bed frame gas supply hose 182 routes air from air box 124 to leg gas manifold 78', which is connected to feet gas manifold 76' by hose 338. Valves 340 are provided in hoses 332 and 338 for purpose to be explained below. Each of the gas manifolds 76, 76', 78, 78', 80, 80', 82, 82' and 84 is mounted to the underside of the baseboards 46, 48, 50 and 52, feet baseboard 46 having gas manifolds 76 and 76' mounted thereto, leg baseboard 48 having gas manifolds 78 and 78' mounted thereto, and seat baseboard 50 having gas manifolds 80 and 80' mounted thereto. The head baseboard 52, and its corresponding section 14"" of frame 12, is provided with two back gas manifolds 82 and 82' and head gas manifold 84.

Because the feet baseboard 46 extends beyond the end member 16 of the frame 12 at the foot of the bed, T-intersects 86 and 86' are provided from the feet gas manifolds 76 and 76', respectively, to route feet extension hoses 88 and 88' to the holes 64 and 64' at the extreme ends of the feet baseboard 46 (see FIGS. 3, 7 and 11). Clamps 65 and 65' are provided to hold the feet extension hoses 88 and 88' in place on the nipples 23 in holes 64 and 64' and on T-intersects 86 and 86'. The head baseboard 52 likewise extends beyond the end member 16 of frame 12 at the head end of the bed (FIGS. 3 and 6), and T-intersect 92 is provided from the head gas manifold 84 to provide air to the hole 64 at the extreme end of the head baseboard 52 by means of the head extension hose 94. A clamp 65 is provided to retain head extension hose 94 on T-intersect 92 and on the receptacle 66 in hole 64.

Air enters the gas manifolds 76, 76', 78, 78', 80, 80', 82, 82', and 84 from each respective bed frame gas supply hose 174, 176, 178, 180 or 182 and hose 332, 334, 336, or 338, and then passes down the length of each gas manifold 76, 76', 78, 78', 80, 80', 82, 82' or 84. Air escapes from the gas manifolds 76, 76', 78, 78', 80, 80', 82, 82' or 84 into the air bags 58 through the holes 64 and 64' in the baseboards 46, 48, 50 and 52, thereby inflating the air bags 58.

The holes 64 and 64' through base boards 46, 48, 50 and 52 into the respective air bags 58, 322 and 328 are staggered down the length of the frame 12 of bed 10. In other words, every other hole 64, or 64' is provided with a key slot 11 (see FIG. 5A). Air bags 322, 325 and 328 are provided with a single nipple 70 or 23, respectively and a post 32 with retainer 34 thereon for engagement of key slot 11 in hole 64 or 64' at the other end thereof. The air bags 322, 325 and 328 alternate in their orientation on baseboards 46, 48, 50 and 52, resulting in about half the air bags 58, 322 and 328 being oriented with nipple 70 or 23 closer to one side of bed frame 12 than the nipple 70 or 23 of the other half of the air bags 58, 322 or 328 mounted thereon.

Because each of the bed frame gas supply hoses 174, 176, 178, 180 and 182 is continuous with a corresponding gas manifold 76, 76', 78, 78', 80, 80', 82, 82' or 84, the amount of air supplied to each gas manifold 76, 76', 78, 78', 80, 80', 82, 82' or 84 can be varied using the valves 128, 130, 132, 134 or 136 on the air box 124. Since each of the valves 128, 130, 132, 134 and 136 controls the amount of air supplied to one of the manifolds 76, 76', 78, 78', 80, 80', 82, 82' or 84, each valve 128 130, 132, 134 or 136 controls the amount of air supplied to the set of air bags 58, 322 or 328 located directly above an individual gas manifold 76, 76', 78, 78', 80, 80', 82, 82' or 84.

As a general rule, the legs of a patient 348 are not as heavy as the other portions of the body, consequently there is less air pressure needed to inflate the air bags 328 under the legs, i.e., those air bags 328 mounted to foot baseboard 46 and supplied with air through feet gas manifolds 76 and 76', than is needed to inflate the other air bags 58, 321, 322 or 325. Valves 340 in hoses 332 and 338 are provided for decreasing the amount of air entering feet gas manifolds 76 and 76' for that reason. Further, decreasing the amount of air delivered to manifolds 76 and 76' causes the air pressure in those air bags 328 supplied with air through manifold 76 to drop more quickly than the air pressure in the air bags 58, 321, 322 or 325 supplied with air by manifolds 78, 80 and 82 as valve 130 is closed during rotation of the patient 348. Likewise, valve 340 is used to cause the pressure to drop in the air bags 328 supplied with air by manifold 76' sooner than the pressure in the air bags 58, 321, 322 or 325 supplied with air by manifolds 78', 80' and 82' as valve 134 is closed during rotation of patient 348. That earlier decrease in pressure in the air bags 328 under the legs of patient 348 causes the pressure changes in the air bags 58, 321, 322 or 325 under the other portions of the body of patient 348.

Also shown in FIG. 3 is the portable power unit, indicated generally at 426. Portable power unit 426 is comprised of case 428 (see FIG. 7), which encloses batteries 430, blower 432 and battery charger 434, and hose 436. Hose 436 is provided with a releasable coupler 438 which mates with the coupler 440 of the hose 442 which is mounted on sub-frame 27 and which connects to air box 124 through funnel 444. Brackets 446 are mounted to subframe 27 for releasably engaging the case 428 of portable power unit 426. Portable power unit 426 provides air pressure to support a patient when an electrical outlet is unavailable, for instance, during patient transport.

As shown in FIG. 4, the opening 342 in manifold plate 145, which is aligned with the opening 202 in full inflate plate 144 (opening 202 in full inflate plate 144 (see FIG. 9B) allows the passage of air through full inflate plate 144 into the valves 128, 130, 132, 134 and 136), is continuous in the area between valves 128 and 130. Opening 342 is a space defined by the margin of- opening 342 in manifold plate 145, the surface of dump plate 150 (shown cut away in FIG. 4), which abuts manifold plate 145 when dump plate 150 is closed, and the surface of full inflate plate 144, which abuts manifold plate 145 when full inflate plate 144 is closed. Similarly, manifold plate 145 is provided with an opening 343 between valves 134 and 136. By connecting valve 128 with valve 130 with opening 342, the air bags 322 and 328 connected to the back, seat, leg and feet gas manifolds 76, 78, 80 and 82 are inflated simultaneously whenever the plug 140 on either of the motors 138 in valves 128 or 130 is not snugged up against full inflate plate 144 by action of motors 138. Similarly, by connecting valve 134 with valve 136 with opening 343, the air bags 322 and 328 connected to the back, seat, leg and feet gas manifolds 76', 78', 80' and 82' are inflated simultaneously. The air bags 58 are inflated by air passing through valve 132 to head gas manifold 84.

As will be explained, means is provided for alternately inflating first the air bags 322 and 328 connected to back, seat, leg and feet gas manifolds 76, 78, 80 and 82, respectively, and then deflating those air bags while inflating the air bags 322 and 328 connected to back, seat, leg and feet gas manifolds 76', 78', 80' and 82'. The alternating inflation and deflation of the first set of air bags 322 and 328 and the second set of air bags 322 and 328 causes a patient 348 supported thereon to be alternately rocked in one direction and then the other (see FIGS. 10A–10D) because of the alternating arrangement of the cutouts 324 on air bags 322 and 328.

With some patients, the air pressure in the air bags 322, 325 and 328 connected to the gas manifolds 76, 78, 80 and 82 is not sufficient to adequately support the patient when the air bags 322, 325 and 328 connected to manifolds 76', 78', 80', and 82' are deflated. That lack of support is a result of the fact that the entire weight of the patient is supported by the air bags 322, 325 and 328 inflated by air received from gas manifolds 76, 78, 80 and 82, in other words, by only about half the air bags 322 325 and 328 Openings 342 and 343 (see FIG. 4) allow the maintenance of a baseline air pressure in the respective sets of air bags 322, 325 and 328 when that set of air bags 322, 325 and 328 is deflated, thereby helping to support patient 348 when patient 348 is rocked in the direction of the pillar 326 of the other set of air bags 322,325 and 328.

For instance, to maintain a baseline pressure in the set of air bags connected to the gas manifolds 76, 78, 80, and 82, the plug 140 in valve 128 is set so as to allow a selected amount of air to pass through the valve 128 and on into the valve 130, through opening 342 depending upon the weight of patient 348. The plug 140 of valve 130 is then connected to a means for periodically causing the motor 138 to move the plug 140 into and out of engagement with full inflate plate 144, thereby varying the amount of air allowed to pass through the valve 130 as well as on into the valve 128 and to the air bags connected to gas manifolds 76, 78, 80 and 82. That arrangement always allows a selected amount of air to pass through the valves 128 and 130, even when he plug 140 is against the full inflate plate 144 to completely close valve 130 as it would be when the plug 140 of valve 134 is open to the widest extent selected by the operator. After a selected period of time, the motor 138 of valve 130 reverses, and plug 140 of valve 130 begins to move away from full inflate plate 144 to open valve 130 while the plug 140 of valve 134 begins to move toward the full inflate plate 144 to close valve 134. In the same manner that a baseline pressure is maintained in the air bags connected to gas manifold 76, 78, 80, and 82, a baseline pressure is maintained in the air bags 322 and 328 connected to the back, seat, leg and feet gas manifolds 76', 78', 80' and 82', respectively, by setting the plug 140 of valve 136 to allow a selected amount of air to pass therethrough and on into valve 134 through opening 343 even when valve 134 is completely closed by plug 140.

Figure 14:
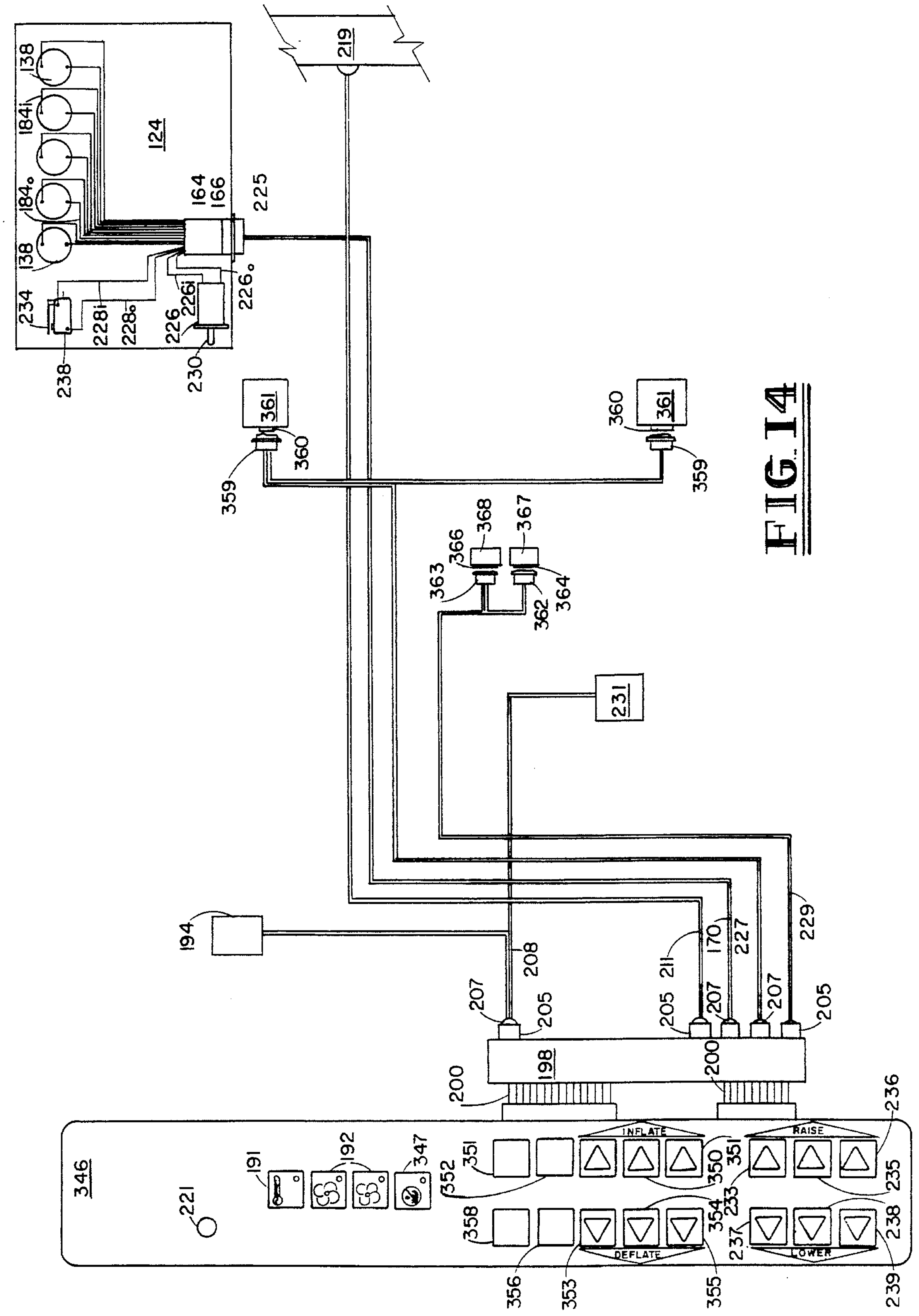
FIG. 14 is schematic diagram of the electrical cables and controls which open and close the valves to route air to the air bags of the low air loss bed of FIG. 1.

In this manner, a patient 348 (see FIGS. 10A–10D) supported on the top 323 air bags 322 and 328 can be alternately rocked from one side of the bed frame 12 to the other. To accomplish that rocking, air bags 322 and 328 are inflated to a desired pressure by activation of the switches 349, 350 and 351 on control panel 346 (see FIGS. 1 and 14). When switches 349, 350 and 351 are activated, the valves 128, 132, and 136 are opened by movement of the plugs 140 along the shafts 139 of motors 138. Switch 352 functions in similar fashion and opens valves 130 and 134, the switches 349, 350 and 351 being used, along with switches 353, 354 and 355, to adjust the air pressure in the air bags under the head, back and seat, and leg and feet portions of the body of patient 348. Deflate switch 356, like inflate switch 352, closes valves 130 and 134, reducing the air pressure in air bags 322 and 328 simultaneously. Once the desired pressure is reached, the patient 348 rests in the position shown in FIG. 10D. The rotate switch 357 is then activated, causing patient 348 to roll toward one side of bed frame 12 as microprocessor 240 (see FIGS. 12, 13 and 15–20) directs the closing of the valve 130. When patient 348 reaches the desired point, shown in FIG. 10A, the operator has the option of activating pause switch 358 and adjusting the air pressure in the air bags which receive air from valves 128 and 130 by operation of switches 350 and 354 to open or close valve 128. Rotate switch 357 is then activated to cause patient 348 to roll back toward the other side of bed frame 12 as valve 130 opens and valve 134 closes under direction of microprocessor 240. When patient 348 reaches the position shown in FIG. 10C, the operator has the option of activating pause switch 358 and adjusting the air pressure in the air bags which receive air from valves 134 and 136 by operation of switches 351 and 355 to open or close valve 136. Rotate switch 357 is then activated and patient 348 will continue rocking until rotation is once again interrupted. Patient 348 is rocked from the position shown in FIG. 10D to the position shown in FIG. 10C (or 10A) in approximately one minute. Pause switch 358 can be activated at any time during rotation of patient 348, and activation of any of the switches 352, 356 or 357 de-activates switch 358.

The hump 330 in air bags 328 provides a longitudinal barrier along the top surface of the air bags 328 such that one of the legs of patient 348 is retained on either side of the longitudinal barrier created by the humps 330 even during the alternating inflation and deflation of the bags 328. In this manner, the hump 330 prevents patient 348 from rolling too far to one side of the bed frame 12 or the other. Further, the legs of patient 348 do not slide and/or rub together while patient 348 is being alternately rolled from one side of the bed frame 12 to the other. It will be understood by those skilled in the art that the air bags 328 having the humps 330 therein can be replaced by air bags 322 or air bags 58 depending upon the type of therapy and the extent of motion desired for a particular patient.

Figure 15:
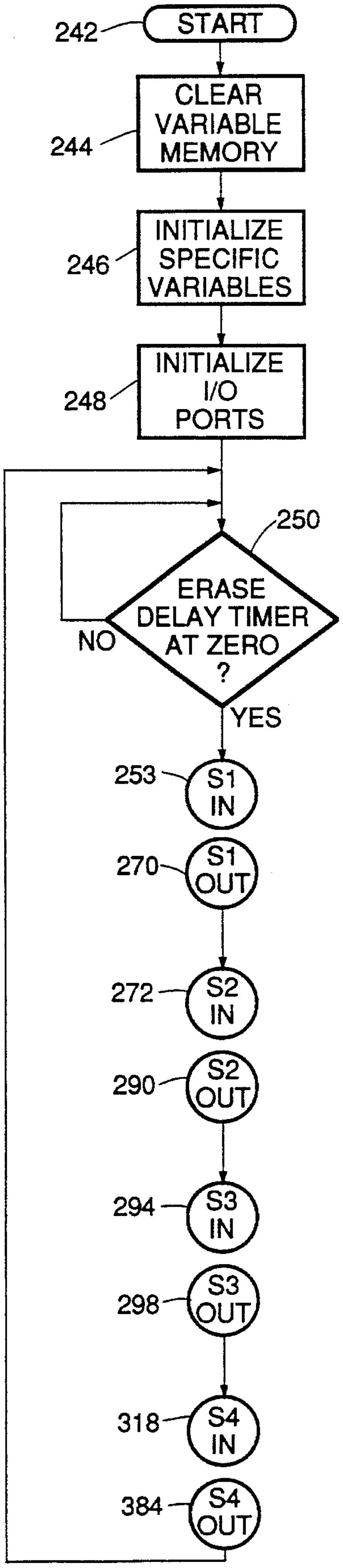
FIG. 15 is a flow chart of a presently preferred embodiment of the program for controlling the operations of the low air loss bed in FIG. 1 from the control panel shown in FIG. 12.
Figure 16:
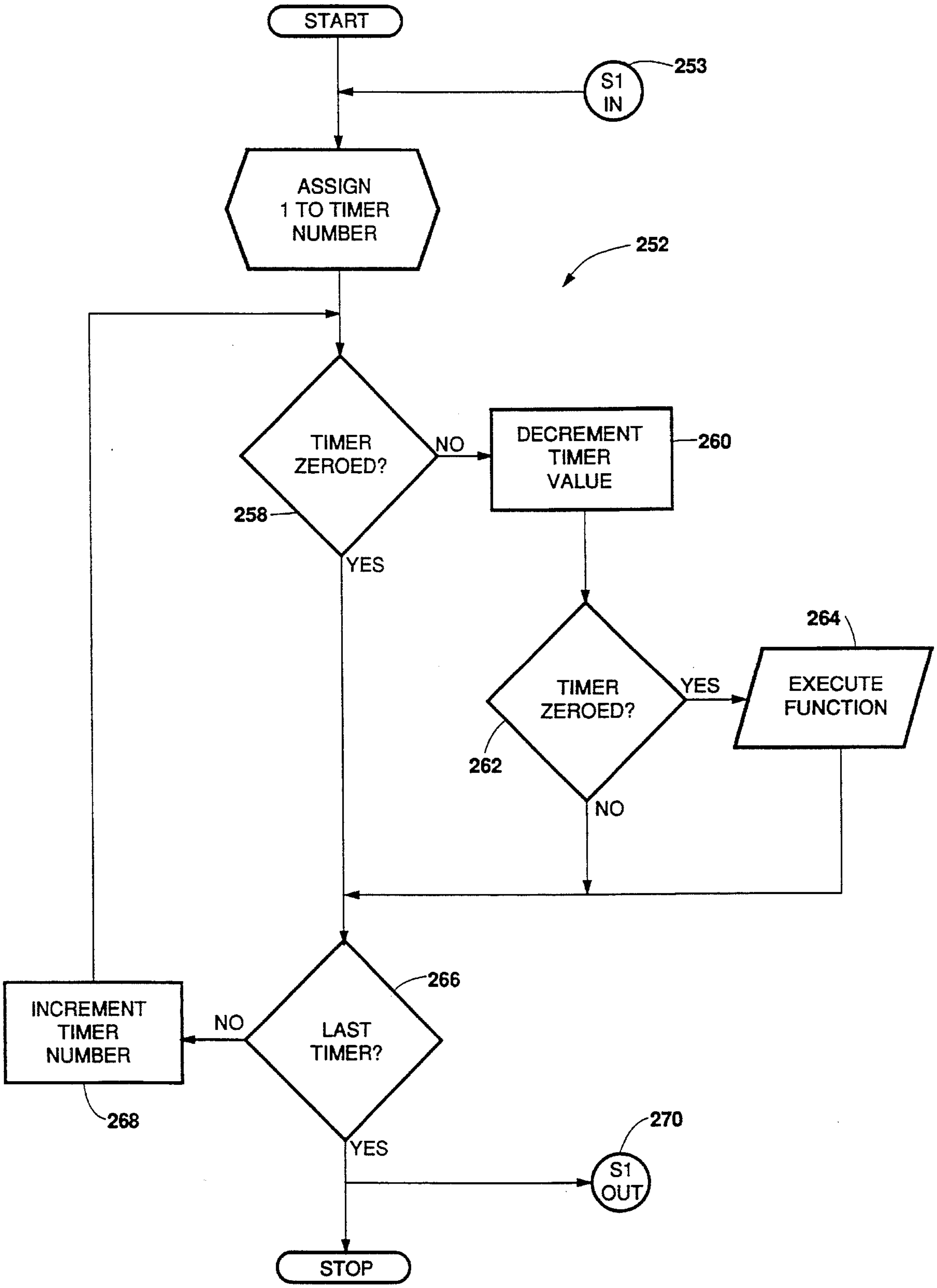
FIG. 16 is a flow chart of the general timer subroutine for controlling the operation of the low air loss bed of FIG. 1.

Referring now to FIGS. 15–20, the programming of microprocessor 240 will be discussed. As shown in FIG. 15, the initialization of the program is at 242. Variable memory is cleared at step 244. Before internal or external interrupts are enabled, all RAM variable contents are zeroed and those requiring specific data are initialized at step 246. Data and direction registers for the four eight bit ports of microprocessor 240 are then initialized at step 248.

The control software then idles in loop 250 until it receives a 50 millisecond interrupt from the hardware interrupt timer internal to microprocessor 240. Microprocessor 240 then sequentially executes the subroutines 252, 254, 292 and 316, diagrammed in FIGS. 16–19. General timer subroutine 252 (see FIG. 16) decrements most of the software driven timers contained in the ROM, including the bed motor "ON" run time limit timer, the electrically alterable ROM power on delay before erase timer, the cardiopulmonary switched "OFF" to the audible alarm "ON" delay timer, the audible alarm silence timer, and the front panel status pilot light blink timer. General timer subroutine 252 is entered from FIG. 15 at connector 253, and each of the timers is assigned a number at step 255 and processed using a repeated algorithm in which, if the time value is zero at 258, no action is taken. If the timer value is not zero, the timer is decremented at step 260 and again checked for a value of zero at 262. If zeroed, the specific timer function is executed at 264, otherwise the subroutine advances to the next timer for similar processing by comparing the timer number to a limit number at step 266 and incrementing the timer number at step 268 if the timer number does not correspond to the limit number. The general timer subroutine 252 is then exited when the last timer has been processed, and connects back into the control software at 270 (see FIG. 15).

Figure 17:
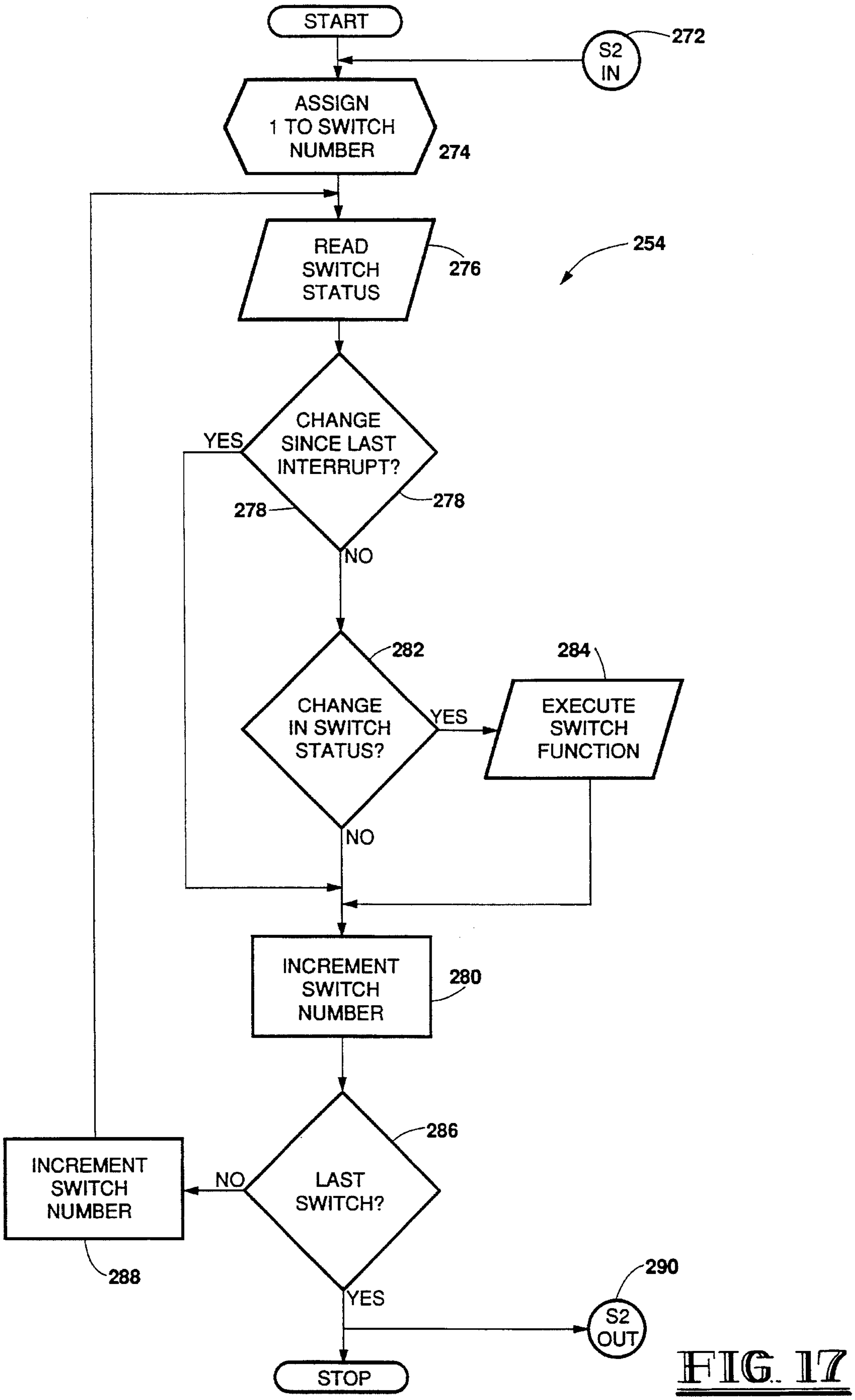
FIG. 17 is a flow chart of the switch processing subroutine for controlling the operation of the low air loss bed of FIG. 1.

The switch processing subroutine 254 is diagrammed in FIG. 17, and monitors the status of the switches on control panel 348 the switches 226 and 228 in air box 124, the contacts of thermostat 19G (see below), the status of the switches (not shown) of head control 361 (see FIG. 14), and pressure sensor pad switch 231. Switch processing subroutine 25G is entered from FIG. 15 at connector 272, assigns a number to each input at step 27G, and processes each numbered input'in loop fashion. Each input is tested for status at 50 millisecond intervals at step 276 although it will be understood by those skilled in the art who have the benefit of this disclosure that other time intervals may likewise be appropriate for testing the status of the inputs. Switch status is tested by comparing the current switch status with the status of the switch from the last test at step 278. If a change is detected, a switch bounce condition is assumed and the switch number is incremented at step 280 for processing the next switch input. If a change from the prior switch status is not detected, a switch position change test is made at step 282 and the appropriate action is taken at step 284 if a switch change is detected. If the switch status is consistent through three successive tests, no switch position change is indicated and the switch number is incremented at step 280 as described above. Switch number is compared to a limit number at step 286, and if less then that limit number, the above processing is repeated in loop 288 for the incremented switch number. Switch processing subroutine 254 is exited when the last switch number has been processed and connects back into the control software at 290.

Figure 18:
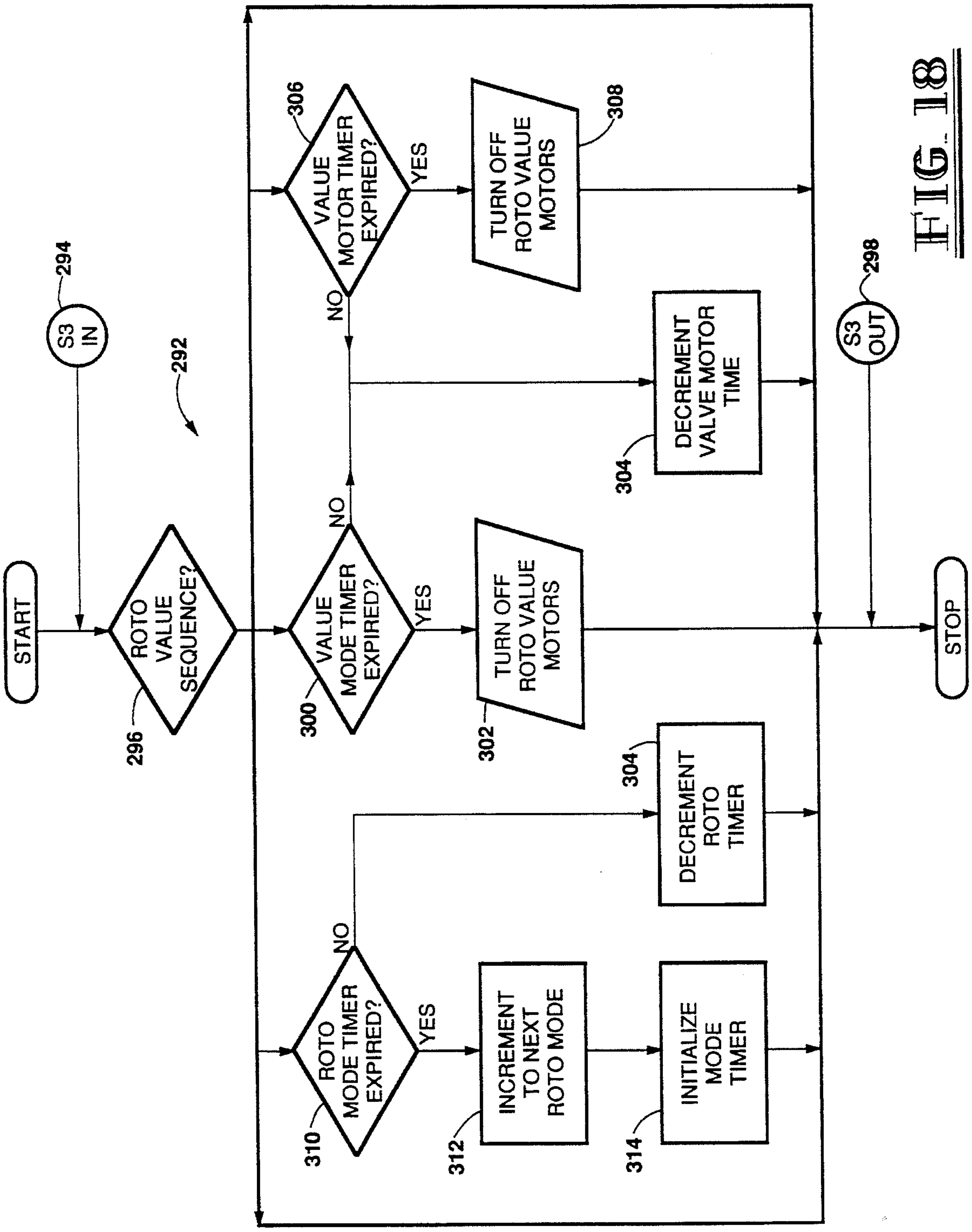
FIG. 18 is a flow chart of the rotation subroutine for controlling the operation of the low air loss bed of FIG. 1.

The rotation subroutine 292, diagrammed in FIG. 18, converts bed rotation commands from control switches 352, 356 and 357 (see FIGS. 1 and 14) into air valve motor function request commands. Rotation subroutine 292 is entered from FIG. 15 at connector 294. There are five paths which can be followed by rotation subroutine 292 depending upon the status of the rotation valve sequence selected by the operator, which is tested at step 296. If no rotation command has been selected, or if pause switch 358 was activated, subroutine 292 is exited through connector 298 back into the control software (FIG. 15). If switch 352 is activated, the motors 138 of valves 130 and 134 are requested to open the valves fully and the status of the timer of the valve motors 138 is tested to determine whether the requisite period of time has passed to accomplish the result at step 300. If the requisite period of time has passed, the motors 138 of valves 130 and 134 are turned off at step 302 and subroutine 292 is exited. If the requisite period of time has not passed, the rotation timer is decremented at 304 and subroutine 292 is exited. If deflate switch 356 is activated, the motors 138 of valves 130 and 134 are requested to close the valves fully and the status of the timer of the valve motors 138 is tested to determine whether the requisite period of time has passed to accomplish that result at step 306. If the requisite period of time has passed, the motors 138 of valves 130 and 134 are turned off at step 308 and subroutine 292 is exited. If the requisite period of time has not passed, the rotation timer is decremented at 304 and subroutine 292 is exited. If rotate switch 357 is activated, valves 130 and 134 are requested to alternately open and close under timer control and the rotation mode timer status is tested at step 310 to determine whether the time has expired, in which case the timer is incremented to the next timer mode at step 312 and the mode timer is initialized at 314 before exiting subroutine 292. If tile requisite period of time has not expired, the rotation timer is decremented at 304 and subroutine 292 is exited.

Figure 19:
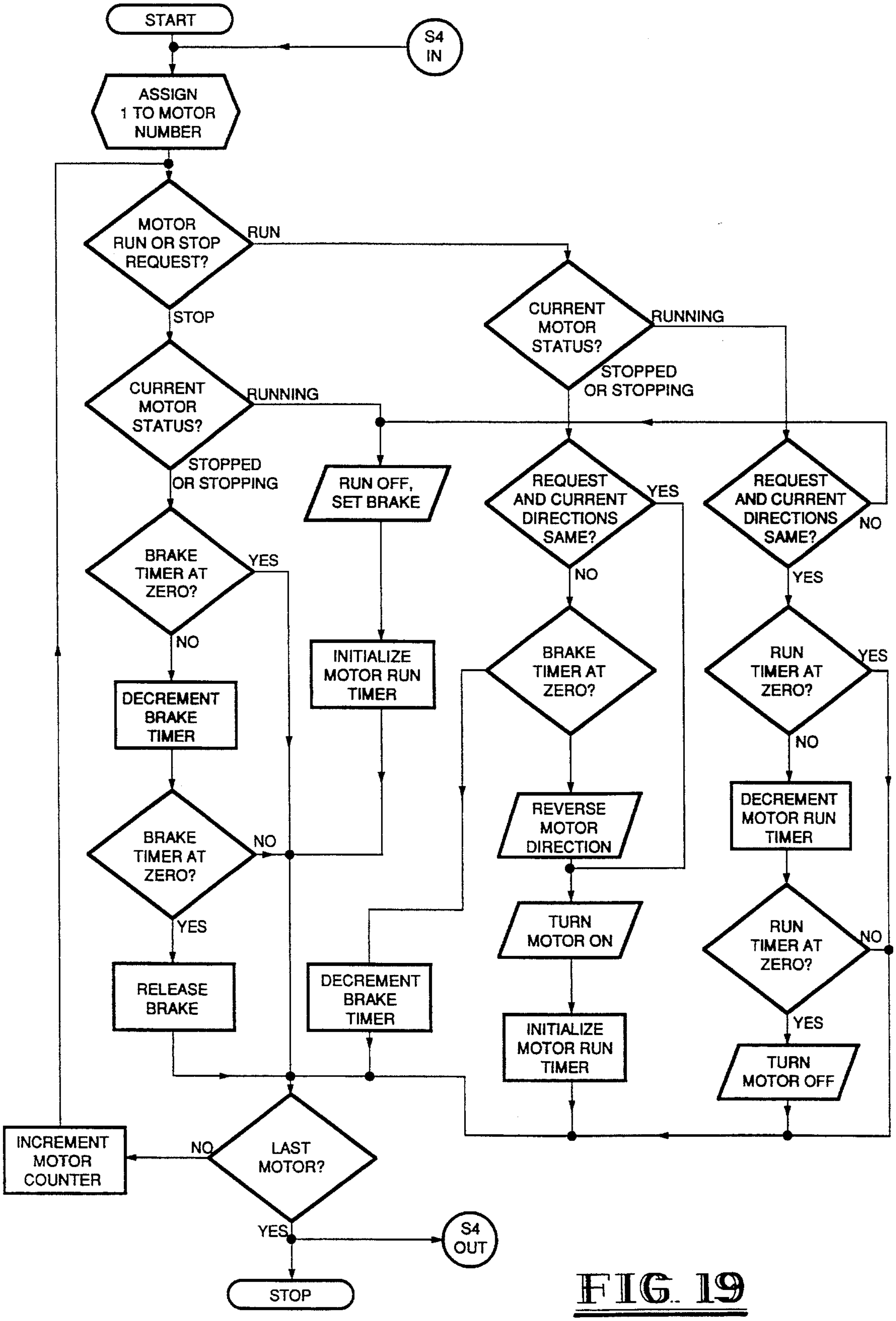
FIG. 19 is a flow chart of the valve motor subroutine for controlling the operation of the low air loss bed of FIG. 1.

The valve motor subroutine 316, diagrammed in FIG. 19, converts valve motor movement commands generated by the switch processing and rotation subroutines 254 and 292, respectively, in the valve motor operations, i.e., starting, braking, coasting, and reversing each of the motors 138 used to open and/or close valves 128, 130, 132, 134, and 136. Valve motor subroutine 316 is entered at connector 318. Each motor 138 is assigned a number at step 320 and is tested for its requested status, i.e., run or stop, and direction as compared to its current status at step 370. Whenever a running motor is requested to stop, the status of that motor is tested at step 372, and if stopped or stopping, the brake timer is tested at step 374 to determine whether the brake timer is zeroed. If the brake timer is not zeroed, the brake timer is decremented at step 376 and tested again at step 378 to determine whether the brake timer is zeroed. If so, the brake is released at step 380 and the number assigned to that motor 138 is compared to the limit number at step 382 to determine whether that motor 138 is the last motor. If the status of the motor 138 is running at step 372, the motor 138 is turned off and the brake brake set at step 388, and timer is then initialized at step 390. If the motor 138 is not the last motor, the motor counter is incremented at step 386 and the above processing repeated.

Referring again to step 370, if the requested status of the motor 138 tested is that the motor 138 is to run, the current motor status is tested at 392. If the status of the motor 138 being tested is that the motor 138 is stopped or stopping, the requested status and the current status of the motor are compared to determine whether they are the same at step 394. If the requested status and the current status are not the same, the brake timer is tested to determine whether the brake timer is at zero at step 396. If the brake timer is not zeroed, the brake timer is decremented at step 398 and the number assigned that motor 138 is tested at step 382 to determine whether that motor 138 is the last motor. If motor 138 is not the last motor, the motor timer is decremented at step 386 and the above processing repeated. If the brake timer is zeroed at step 396 the direction of rotation of motor 138 is reversed at step 400, motor 138 is turned on at step 402 the motor run timer is initialized at step 404 and the number assigned to that motor 138 is tested at step 382 to determine whether that motor 138 is the last motor. If motor 138 is not the last motor the motor timer is decremented at step 386 and the above processing repeated. If the requested status and the current status are the same at step 394, motor 138 is turned on at step 402, the motor run timer is initialized at step 404 and the number assigned to that motor 138 is tested to determine whether that motor 138 is the last motor. If motor 138 is not the last motor, the motor timer is decremented at step 386 and the above processing repeated.

Returning to step 392, if the current status of motor 138 is that the motor 138 is running the requested status and the current status are compared at step 406 to determine whether they are the same. If requested and current status are not the same, motor 138 is switched off and the brake is set at 388, the brake timer is initialized at step 390 and processing continues as described above. If the requested and current status of motor 138 are the same, the motor run timer is tested at step 408 to determine whether the run timer is zeroed. If the run timer is not zeroed the motor run timer is decremented at step 410 and tested again at step 412 to determine whether the run timer is zeroed. If so, motor 138 is turned off at step 414, the number assigned to motor 138 is compared to the limit number at step 382 to determine whether motor 138 is compared to the limit number at step 382 to determine whether motor 138 is the last motor, and processing continues as described above. If the run timer is zeroed at step 408 or 412, the number assigned to motor 138 is compared to the limit number at step 382 to determine whether motor 138 is the last motor and processing continues as described above.

Figure 20:
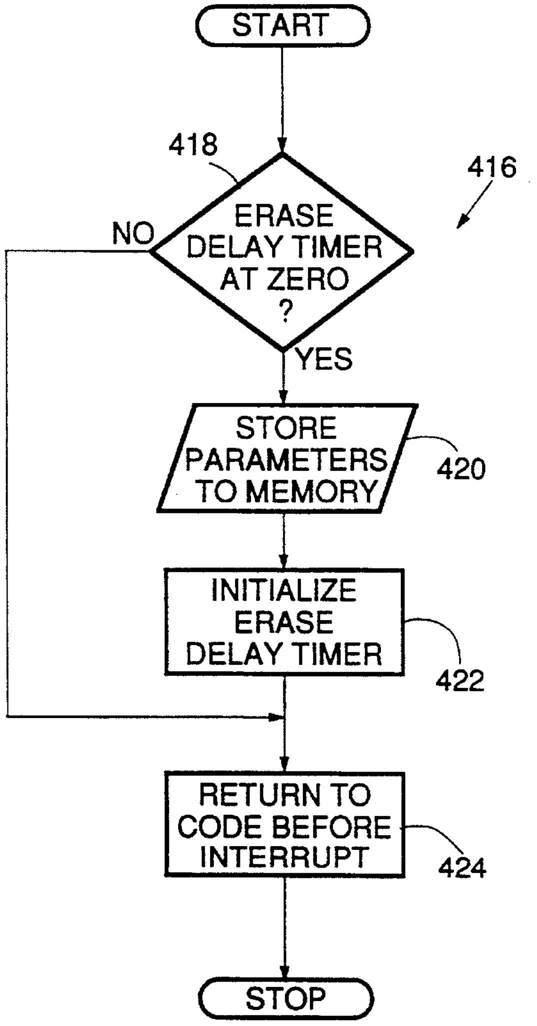
FIG. 20 is a flow chart of the power fail interrupt subroutine for controlling the operation of the low air loss bed of FIG. 1.

A power fail interrupt subroutine 416, diagrammed in FIG. 20, writes certain controller configuration parameters such as blower and rotation mode status in the electrically alterable ROM in the event of a power failure or when low air loss bed 10 is unplugged. Power fail interrupt subroutine 416 is entered upon receipt of an interrupt from an external hardware interrupt (not shown). If the electrically alterable ROM power on delay before erase timer (EEROM timer) tested at step 418 is zeroed, low air loss bed 10 has been powered on for more than a few seconds such that the electrically alterable ROM is available for writing, and the aforementioned parameters are stored to memory at step 420 and the EEROM timer is initiated at step 422 before returning to the codes before the interrupt at step 424. If the EEROM timer is not zeroed at step 418, low air loss bed 10 has probably just been powered on and the memory is not available for writing. Should the control software (see FIG. 15) receive a power interruption that generates the power fail interrupt and performs the memory write but does not actually interrupt power to the control software, power fail interrupt subroutine 416 initializes the EEROM timer and will be available to rewrite the memory after the EEROM timer has once again timed out.

As noted above, the frame 12 is hinged at 44', 44" and 44'44", allowing the baseboards 46 and 52 to be raised from the horizontal, changing the angle of inclination for the comfort of 348 patient or for therapeutic purposes. However, especially when head baseboard 52 is raised, the deviation from the horizontal places a disproportionate amount of the weight of patient 348 on the air bags 322 over the legs 48 and seat 50 baseboards. In a presently preferred embodiment of the present invention, there are only three air bags 322 mounted on each of the baseboards 48 and 50, such that a great proportion of the patient's weight, which is spread out over more than 20 of the air bags 58, 322 and 328 when the sections 14', 14", 14''' and 14'''' are all in the same horizontal plane, is concentrated onto as few as six of the air bags 322. A pressure sensor pad switches 231 are placed flat on legs baseboard 48 and seat baseboard 50 so that, in the event a portion of the patient's body contacts either one of those switches 231, action can be taken to boost the air pressure in the air bags 322 mounted to seat baseboard 50. For instance, in a presently preferred embodiment, the above-described buzzer is activated by contact with either of the pressure sensor pad switches 231, the alarm buzzer is silenced by activating switch 347, and the air pressure in air bags 322 mounted to seat baseboard 50 is raised by activation of switches 350 and 351. Those operations can also be programmed directly into microprocessor 240 such that the alarm buzzer is unnecessary because correction of the air pressure in those air bags 322 is automatic when, for instance, a patient's head and upper body is raised by activating switch 233 (see below).

Referring to FIGS. 1, 4, 6, and 9B, air chucks 212 are provided in the dump plate 150 which communicate, in airtight sealing relationship, to the opening in each of the couplers 153 of valves 128–136. Using these air chucks 212 as a take off point for air pressure lines 213 and corresponding air pressure gauges 241 (see FIG. 1), the pressure in each sealed bed frame supply hose 174–182, and hence, in each set of air bags 58, 59, 321, 322, 325 and/or 328 can be checked and the appropriate valves 128–136 adjusted to give a desired air pressure in an individual set of air bags 58, 59, 321, 322, 325 and/or 328. Gauges 241 are enclosed within case 243 which can be releasably mounted to head or footboards 20 or 21, respectively by J-brackets 245.

Figure 12:
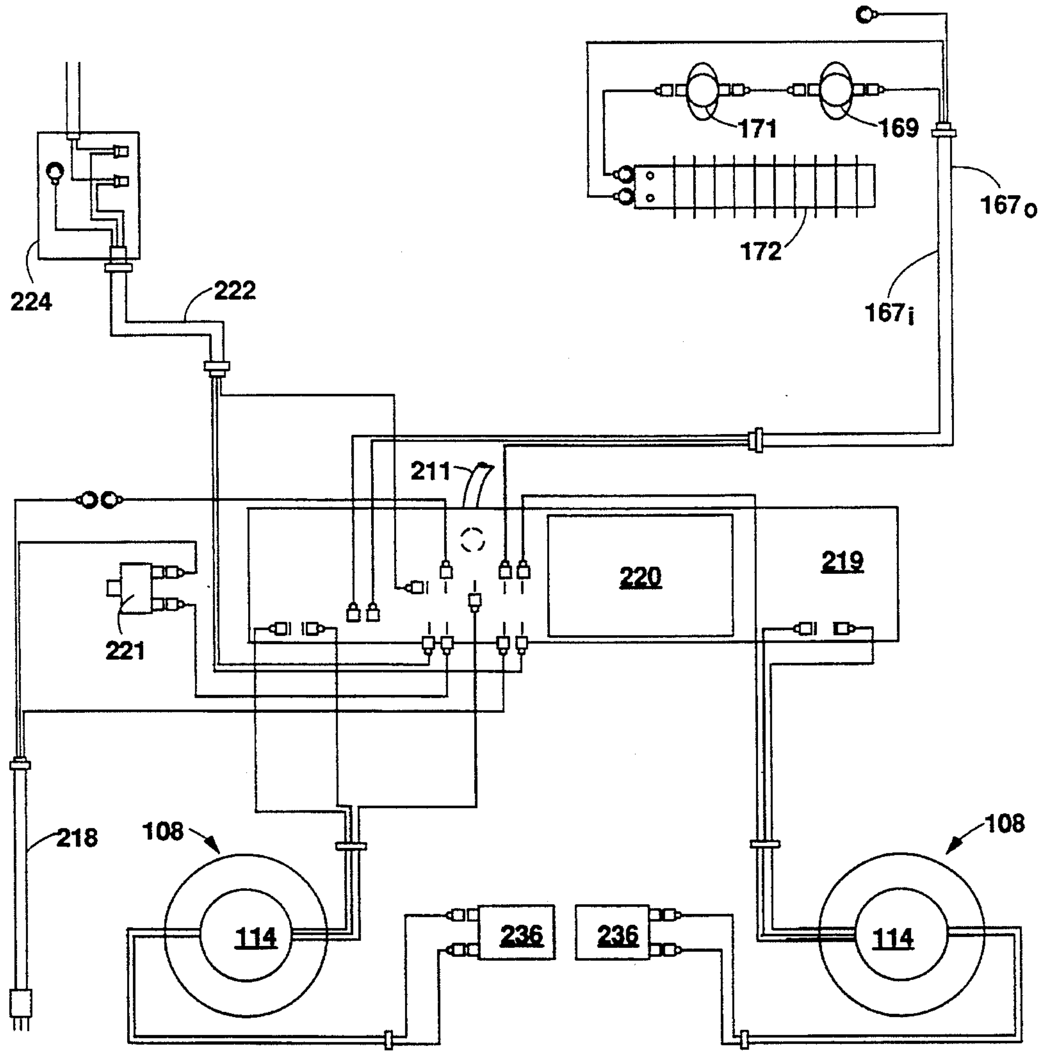
FIG. 12 is a schematic electrical diagram of the low air loss bed of FIG. 1.

Referring to FIG. 12, there is shown a schematic electrical diagram of a low air loss bed constructed according to the teachings of the present invention. Alternating current enters the circuitry in electric cord 218, which is connected to power distribution board 219. Power distribution board 219 includes a power supply module 220 to supply power to microprocessor 240 through cable 222 and solid state relays to control each of the blowers 108 and heater strip 172. Power distribution board 219 provides power to the motors within boxes 45 for raising, lowering and positioning the frame 12 of low air loss bed 10 by means of lead 223 which connects to junction box 224. Power distribution board 219 also powers the electric motors 114 of blowers 108. Each of the blowers 108 is provided with a capacitor 236, and a pilot light 221 is provided on control panel 348 (see FIG. 13). Switches 192 are provided on control panel 346 for activation of each blower 108.

Referring to FIG. 13, the sensor (not shown) of thermostat 194 is located in seat manifold 80, and when the circuit containing thermostat 194 is closed due to the temperature of the air in seat manifold 80, heating strip 172 is switched on by microprocessor 240. Thermostat 194 also includes a control 189 for adjustment of the temperature of the gas in seat gas manifold 80, and switch 191 on control panel 346 can be used to activate or deactivate the heating function.

Limit switches 226 and 228 are provided in manifold plate 145 and on full inflate plate 14, respectively (see FIGS. 4, 8, 9A and 13). Limit switch 226 is closed when push button 230 is engaged by dump plate. When push button 230 is disengaged by the movement of dump plate 150 away from manifold plate 145 under the influence of levers 165, the circuit is opened and blowers 108 are shut off. Limit switch 228 is affixed to full inflate plate 144 by screws 232, and the circuit is open when lever arm 234 engages manifold plate 145. When full inflate plate 144 is opened under the influence of full inflate knobs 193, limit switch 228 is closed, activating the buzzer which is incorporated into microprocessor 240. A switch 347 is provided on control panel 346 to silence that buzzer.

Control panel 346 is connected to controller 198 by ribbon connectors 200. Controller 198 includes microprocessor 240 and the other necessary circuitry. Controller 198 is provided with plug-type receptors 205 for receiving the plugs 207 of cables 108, 211,225,227 and 229.

Cable 208 connects controller 198 to thermostat 194 and the pressure sensor pad switches 231. Cable 211 connects directly to power distribution board 219 and feeds power to controller 198 while conducting control signals to power distribution board 219 to control the functions of blowers 108 and heating element 72. Cable 170 is provided with separate wires $\mathbf{189}_i$ and $\mathbf{186}_o$ for each motor 138 and plug 225 at other end from plug 207 which engages the connector 166 in the wall of air box 124, thereby conducting low voltage D.C. current to each of the motors 138 by wires $\mathbf{189}_i$ and $\mathbf{189}_o$. Cable 170 is also provided with separate wires $\mathbf{226}_i$ and $\mathbf{226}_o$ and $\mathbf{228}_i$ and $\mathbf{228}_o$ connecting separately to limit switches 226 and $\mathbf{228}_i$ respectively.

Cable 227 is provided with plugs 359 and the other end from plug 207 for engaging a complementary plug 360 on a separate hand control 361 which duplicates the function of switches 349–358 on control panel 346. Hand controls 361 are shown schematically in FIG. 14 because they are similar in construction and circuitry to that portion of controller 198 and keyboard 346 which functions are duplicated. Plugs 359 are provided on both sides of bed frame 12 (not shown in FIG. 14) to facilitate easy access to the board for adjustment by hospital personnel.

Cable 229 is provided with plugs 362 and 363 at the other end from plug 207 for engaging complementary plugs 364 and 366, respectively. Plug 364 is located in the circuitry of the board frame 12 in circuit box 43 (see FIG. 7), shown schematically at box 367. Plug 366 is located on a hand control, shown schematically at 368, which duplicates the function of switches 233 and 235–239 on control panel 346. When hand control 368 is used to adjust the angle of inclination of head and foot baseboards 54 and 46, respectively, signals generated by activation of the switches (not shown) on hand control 368 are transmitted directly to the circuitry 367 of bed frame 12.

Although the present invention has been described in terms of the foregoing preferred embodiments, this description has been provided by way of explanation only and is not to be construed as a limitation of the invention, the scope of which is limited only by the following claims.

What is claimed is:

1. A low air loss bed, comprising a frame means having first and second sides;

a first set of air bags for supporting a patient thereon, the first set of airbags having a top surface and being mounted transversely on the frame means;

a second set of air bags for supporting a patient thereon, the second set of air bags having a top surface and being mounted transversely on the frame means between the air bags of the first set;

means for separately connecting each of the air bags of the first and second sets to a gas source;

first means for rolling a patient formed in the top surface of each of the air bags of the first set, wherein when the air bags of the first set are inflated and/or the air bags of the second set are deflated one side of a patient supported thereon is rolled toward the first side of the frame means;

second means for rolling a patient formed in the top surface of each of the air bags of the second set, wherein when the air bags of the second set are inflated and/or the air bags of tile first set are deflated the other side of the patient supported thereon is rolled toward the second side of the frame means; and means for retaining the patient supported on the first or second set of air bags when the patient is rolled toward the first or second side of the frame means.

2. The low air loss bed of claim 1, wherein the frame means further comprises a hinged section for adjusting the angle of inclination of the patient; and each of the first and second sets of air bags comprises at least one group of air bags mounted to the separate, hinged section of the frame means.

3. The low air loss bed of claim 2, wherein each of the first and second sets of air bags is provided with separate connections to the air bags and gas source connecting means for separately adjusting the pressure of each set of bags for the comfort or therapy of the patient.

4. The low air loss bed of claim 3, wherein the air bag and gas source connecting means comprises a plurality of air supply hoses; and means for changing the flow of air supplied to the air bags of the first and second sets.

5. The low air loss bed of claim 4, further comprising means for maintaining a baseline air pressure in the air bags of the first and second sets, the baseline maintaining means being operatively connected to the air flow changing means.

6. The low air loss bed of claim 1, further comprising means for varying the extent and speed with which the patient may be rolled toward the first and second sides of the frame.

7. A patient support system, comprising a plurality of inflatable air bags for maintaining low interface pressures between the air bags and a patient supported thereon, the air bags being transversely mounted to a frame and having cutouts of varying shapes formed in a top surface thereof for alternately rolling a patient supported thereon toward one side of the frame and toward a side opposite the one side of the frame by adjusting the air pressures in the air bags, thereby rolling the patient into and out of the cutouts as the air pressures in the air bags are changed for inhibiting the formation of bed sores and/or permitting the healing thereof that may be caused by prolonged contact of the patient with a hard surface and/or inhibiting the development of pulmonary congestion.

8. The patient support system of claim 7, wherein the frame further comprises a hinged section that allows the adjustment of the angle of inclination thereof for the comfort and/or therapy of the patient; and the plurality of air bags comprises separately inflatable groups of air bags that are mounted to the hinged section of the frame.

9. The patient support system of claim 8, further comprising means for separately adjusting the pressure in each group of air bags.

10. The patient support system of claim 7, wherein each air bag is releasably mounted to the frame.

11. The patient support system of claim 7, wherein the plurality of air bags comprises first and second sets of inflatable air bags mounted to the frame; and the cutouts in the top surfaces of the air bags of the first set are closer to the one side of the frame and the cutouts in the top surfaces of the air bags of the second set are closer to the opposite side of the frame.

12. The patient support system of claim 11, further comprising means for alternately inflating the first and second sets of air bags.

13. The patient support system of claim 12, wherein when the first set of airbags is inflated and/or the second set of air bags is deflated, one side of the patient supported thereon is lowered and the patient is rolled toward the one side of the frame; and when the second set of air bags is inflated and/or the first set of air bags is deflated, the other side of the patient is lowered and the patient is rolled toward the opposite side of the frame.

14. A low air loss bed for therapeutically inhibiting the formation of bed sores caused by prolonged contact between the skin of a patient and a hard surface, and/or promoting the healing thereof, and/or inhibiting the development of pulmonary congestion, comprising a frame provided with a first side and a second side opposite the first side;

first and second sets of air bags transversely mounted on the frame for supporting a patient thereon while maintaining low interface pressure between the patient and the air bags, wherein each air bag of the second set is alternately mounted between air bags of the first set;

means for separately inflating each of the first and second sets of air bags; and means on each of the air bags of the first and second sets for alternately rolling a patient supported thereon toward the first side of the frame by inflating the first set of air bags and/or deflating the second set of bags, and then toward the second side of the frame by deflating the first set of air bags and/or inflating the second set of air bags.

15. The low air loss bed of claim 14, wherein the frame further comprises a hinged section that allows the adjustment of the angle of inclination thereof; and each of the first and second sets of air bags comprise at least one group of bags that are mounted to the hinged section of the frame in a manner such that each of the first and second group(s) of air bags corresponds to a portion of the body of a patient supported thereon.

16. The low air loss bed of claim 14, further comprising means for changing the extent and speed with which the patient is rolled toward the first and second sides of the frame.

17. The low air loss bed of claim 14, further comprising means on the air bags of the first and second sets for retaining a patient thereon when being rolled toward the first or second side of the frame.

18. The low air loss bed of claim 14, wherein the patient rolling means comprises a cutout in the top surface of at least some of the air bags of the first and second sets, the at least some of the air bags of the first set being mounted to the frame with the cutouts closer to the first side of the frame and the at least some of the air bags of the second set being mounted to the frame with the cutouts closer to the second side of the frame.

19. The low air loss bed of claim 14, further comprising means for maintaining a baseline air pressure in the air bags of the first and second sets.

20. The low air loss bed of claim 14, wherein the air bag inflating means comprises a plurality of air supply hoses; and means for changing the flow of air supplied to the bags, wherein the supply hoses connect the air flow changing means to the air bags of the first and second sets.

21. A patient support system for reducing pressure points and/or inhibiting the formation of bed sores on a patient, comprising frame means provided with a first side and a second side opposite the first side;

first and second sets of substantially rectangular air bags for maintaining low interface pressure between each air bag and a patient supported on a top surface thereof having varying shaped cutouts formed near one end of the top surface thereof, each air bag of the first set being transversely mounted on the frame with its cutout placed closer to the first side of the frame and each air bag of the second set being transversely mounted on the frame and intercalated between the air bags of the first set with its cutout placed closer to the second side of the frame;

means for separately connecting each of the air bags of the first and second sets to a gas source;

means for changing the amount of air supplied through the air bags and gas source connecting means to the air bags of the first and second sets; and means for alternately inflating the first set of air bags and/or deflating the second set of air bags and inflating the second set of air bags and/or deflating the first set of air bags, whereby when the inflation of the first set of air bags is greater than that of the second set of air bags the patient is rolled toward the first side of the frame, and when the inflation of the second set of air bags is greater than that of the first set of air bags the patient is rolled toward the second side of the frame to thereby therapeutically inhibit the formation of bed sores and/or permit the healing thereof while inhibiting the development of pulmonary congestion.

22. The patient support system of claim 21, wherein the frame means further comprises a hinged section for adjusting the angle of inclination thereof for the comfort and/or therapy of the patient; and each of the first and second sets of air bags comprises groups of air bags mounted to the hinged sections of the frame, wherein each group of airbags of the first and second sets corresponds to a portion of the body of the patient supported thereon.

23. The patient support system of claim 22, wherein each group of air bags of the first and second sets is provided with separate connections to the air bags and gas source connecting means for adjusting their air pressure for the comfort and/or therapy of the patient, wherein when the air bags of the first set are inflated and/or the air bags of the second set are deflated one side of the patient supported thereon is lowered and the patient is rolled toward the first side of the frame and when the air bags of the second set are inflated while the air bags of the first set are deflated the other side of the patient is lowered and the patient is rolled toward the second side of the frame.

24. The patient support system of claim 21, further comprising means in the air supply changing means for maintaining a baseline air pressure in the air bags of the first and second sets.

25. The patient support system of claim 21, further comprising means for varying the extent and speed with which the patient is rolled toward the first and second sides of the frame.

26. The patient support system of claim 21, wherein each air bag is releasably mounted to the frame.

27. The patient support system of claim 21, further comprising means positioned between the frame and at least some of the air bags of the first and second sets for sensing any pressure exerted by a patient supported on the air bags, whereby when the position of the patient is changed and more of the patient's weight is placed on the air bag under which the sensing means is positioned the air flow to the air bag is increased.

28. The patient support system of claim 21, further comprising means formed on the first and/or second set of bags for retaining the patient thereon when the patient is rolled toward the first or second side of the frame, respectively.

29. The patient support system of claim 21, further comprising means for simultaneously fully inflating the air bags of the first and second sets of air bags.

30. The patient support system of claim 21, further comprising means for simultaneously deflating the air bags of the first and second sets.

31. The patient support system of claim 21, wherein the gas source comprises an air blower.

32. The patient support system of claim 31, further comprising means for simultaneously deflating the air bags of the first and second sets of air bags; and means for switching the air blower off.

33. A low air loss system for supporting a patient thereon comprising:

a plurality of groups of separately inflating air bags transversely oriented with respect to a support, the of each group being alternately positioned side-by-side with the bags of the other groups, for supporting a patient on a top surface thereof at an interface pressure sufficiently low to inhibit and/or prevent the formation of pressure sores when inflated to a baseline pressure;

patient supporting surface of the air bags being shaped to permit the side-by-side rolling of a patient supported thereon by alternately inflating and/or deflating the groups of air bags in a manner effective to inhibit pulmonary congestion while maintaining a low interface pressure and keeping the air bag's inflation above a baseline pressure;

means for inflating the alternately positioned air bags of one group above the baseline pressure to thereby roll the patient support thereon; and wherein each air bag is further provided with a cutout formed in the top surface thereof for receiving one side of the patient when the air bag is inflated above the baseline pressure.

34. The low air loss system of claim 33, further comprising means for retaining the rolling patient on the top surface of the air bags.

35. The low air loss system of claim 34, wherein the retaining means is formed from a portion of the cutout in the top surface of each of the air bags.

36. A patient support system, comprising a frame means provided with first and second sides;

a first set of air bags for supporting a patient on a top surface thereof, the air bags of the first set being transversely mounted on the frame means;

a second set of air bags for supporting a patient on a top surface thereof, the air bags of the second set being transversely mounted on the frame means and intercalated between the air bags of the first set;

means for separately connecting each of the air bags of the first and second sets to an air blower;

means formed in the top surface of the air bags of the first set for lowering one side of a patient supported thereon and for rolling the patient toward the first side of the frame means when the air bags of the first set of air bags are inflated and/or the air bags of the second set are deflated; and means formed in the top surface of the air bags of the second set for lowering the side opposite the one side of a patient supported on the air bags and for rolling the patient toward the second side of the frame means when the air bags of second set are inflated and/or the air bags of the first set are deflated.

37. The patient support system of claim claim 36, wherein the frame means further comprises a hinged portion that allows the adjustment of the angle of inclination thereof for the comfort and/or therapy of the patient; and the first and second sets of air bags comprise separately inflatable groups of air bags that are mounted to the hinged frame means.

38. The patient support system of claim 36, wherein each set of air bags is provided with separate connections to the air bags and blower connecting means for adjusting the pressure in each set of air bags for the comfort and/or therapy of the patient.

39. The patient support system of claim 36, further comprising means operatively connected to the air bags and blower connecting means for maintaining a baseline pressure in the air bags of the first and second sets.

40. The patient support system of claim 37, further comprising a third set of air bags for evenly supporting the head of the patient, the baseline pressure of the third set of bags being controlled separately from the alternately raised and lowered pressure of the first and/or the second set of bags.

41. The patient support system of claim 36, further comprising means for varying the extent and speed with which the patient is rolled.

42. The patient support system of claim 36, wherein each air bag is releasably mounted to the frame means.

43. A patient support system for reducing pressure points and/or inhibiting the formation of bed sores on a patient, comprising a frame means provided with a first side and a second side opposite the first side;

first and second sets of inflatable air bags for maintaining low interface pressure between a top surface of each bag and a patient supported thereon, wherein the bags have varying shape cutouts formed near one end of the top surface thereof and are transversely mounted to the frame means, each bag of the first set having its cutout positioned closer to the first side of the frame means for receiving one side of the patient when the patient is rolled toward the first side of the frame means, and each bag of the second set having the cutout positioned closer to the second side of the frame means for receiving a side of the patient opposite the one side when the patient is rolled toward the second side of the frame means; and means for separately inflating the first and second sets of air bags to alternately roll the patient toward the first side of the frame means when the first set of air bags is inflated and/or the second set of bags is deflated, and then toward the second side of the frame means when the second set of bags is inflated and/or the first set of bags is deflated to therapeutically inhibit the formation of bed sores and/or permit the healing thereof and/or inhibit the development of pulmonary congestion.

44. The patient support system of claim 43, further comprising means for separately connecting the air bags of the first and second sets to an air blower.

45. The patient support system of claim 44, wherein the air bags and air blower connecting means is provided with means for separately changing the amount of air supplied to the air bags of each of the first and second sets of air bags.

46. The patient support system of claim 43, wherein the air bags of the first and second sets have means for preventing the rolling of the patient off the top surfaces thereof.

47. The patient support system of claim 46, wherein the rolling prevention means comprises a pillar formed in the top surface of at least some of the air bags of the first and second sets.

48. The patient support system of claim 47, wherein the pillar forms part of the cutout in the top surface of the air bags of the first and second sets of air bags.

49. The patient support system of claim 43, further comprising means for maintaining a baseline air pressure in the air bags of the first and second sets.

50. The patient support system of claim 42, further comprising a third set of air bags for supporting the head of the patient, the pressure of which is not alternately increased and/or decreased.

51. A patient support system comprising:

a plurality Of inflatable air bags mounted side-by-side and transversely to a frame for maintaining low interface pressures between the bags and a patient supported on a top surface thereof, the side-by-side air bags having alternately sloped walls to provide patient support surfaces for alternately rolling the patient toward a first Side and hen a second side of the frame opposite the first side, by changing the relative air pressures in the bags, to thereby therapeutically inhibit the formation of pressure sores and/or the development of pulmonary congestion;

wherein the frame further comprises a hinged section that permits the adjustment of the angle of inclination of the frame; and the plurality of air bags comprises separately inflatable groups of air bags, at least one group being mounted to the hinged framed section.

52. The patient support system of claim 51, further comprising means for separately adjusting the pressure in each group of air bags.

53. The patient support system of claim 51, wherein the sloped walls of the air bags define spaces for receiving one side of the patient therein when the air pressure in the air bags is adjusted upwardly.

54. The patient support system of the claim 51, wherein the sloped wall of each air bag has a lower end; and the air bags are mounted to the frame in a manner such that the lower ends of the sloped walls of a first set of air bags are closer to the one side of the frame and the lower ends of the sloped walls of a second set of air bags are closer to the opposite side of the frame.

55. The patient support system of claim 54, further comprising means for alternately adjusting the air pressure in each of the first and second sets of air bags upwardly with respect to the other.

56. The patient support system of claim 55, further comprising means for alternately adjusting the air pressure in each of the first and second sets of air bags downwardly with respect to the other.

57. The patient support system of claim 56, wherein one side of the patient is lowered when the pressure in the air bags of the first set is adjusted upwardly with respect to the second set and the patient is rolled toward the one side of the frame; and the opposite side of the patient is lowered when the pressure in the air bags of the second set is adjusted upwardly with respect to the air bags of the first set and the patient is rolled toward the opposite side of the frame.

* * * * *